US010970716B2

(12) United States Patent
Martinez de Velasco Cortina et al.

(10) Patent No.: US 10,970,716 B2
(45) Date of Patent: *Apr. 6, 2021

(54) SYSTEM AND METHOD FOR PROVIDING SECURE IDENTIFICATION SOLUTIONS

(71) Applicant: Neology, Inc., San Diego, CA (US)

(72) Inventors: Francisco Martinez de Velasco Cortina, La Jolla, CA (US); Manfred Rietzler, Marktoberdorf (DE)

(73) Assignee: Neology, Inc., San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/519,961

(22) Filed: Jul. 23, 2019

(65) Prior Publication Data
US 2019/0347639 A1 Nov. 14, 2019

Related U.S. Application Data

(63) Continuation of application No. 16/051,751, filed on Aug. 1, 2018, now Pat. No. 10,445,719, which is a (Continued)

(51) Int. Cl.
*G06Q 20/30* (2012.01)
*G06Q 20/36* (2012.01)
(Continued)

(52) U.S. Cl.
CPC ......... *G06Q 20/3674* (2013.01); *G06F 21/32* (2013.01); *G06K 7/10316* (2013.01);
(Continued)

(58) Field of Classification Search
CPC .. G08B 13/14; G08B 13/2417; G08B 13/248; G08B 25/09; G06K 7/0008; G06K 9/10;
(Continued)

(56) References Cited

U.S. PATENT DOCUMENTS

| 4,529,870 A | 7/1985 | Chaum |
| 5,552,789 A | 9/1996 | Schuermann |

(Continued)

FOREIGN PATENT DOCUMENTS

| DE | 19608757 A1 | 9/1997 |
| DE | 10042805 A1 | 3/2002 |

(Continued)

OTHER PUBLICATIONS

Atmel Corporation, Silicon Solutions Making Smart Cards Smarter, 2000, (12 pages).

(Continued)

*Primary Examiner* — Van T Trieu
(74) *Attorney, Agent, or Firm* — Procopio, Cory, Hargreaves & Savitch LLP

(57) ABSTRACT

The present invention provides a method and system for verifying and tracking identification information. In an embodiment of the invention, a system for delivering security solutions is provided that includes at least one of the following: a radio frequency (RF) identification device, an identification mechanism (e.g., a card, sticker), and an RF reader.

17 Claims, 24 Drawing Sheets

Related U.S. Application Data continuation of application No. 15/707,949, filed on Sep. 18, 2017, now Pat. No. 10,061,949, which is a continuation of application No. 15/372,325, filed on Dec. 7, 2016, now Pat. No. 9,922,217, which is a continuation of application No. 14/084,565, filed on Nov. 19, 2013, now Pat. No. 9,558,385, which is a continuation of application No. 13/350,665, filed on Jan. 13, 2012, now Pat. No. 8,587,436, which is a continuation of application No. 13/175,768, filed on Jul. 1, 2011, now Pat. No. 8,237,568, which is a continuation of application No. 12/688,666, filed on Jan. 15, 2010, now Pat. No. 8,004,410, which is a continuation of application No. 11/279,912, filed on Apr. 17, 2006, now Pat. No. 7,671,746, which is a continuation of application No. 10/615,026, filed on Jul. 9, 2003, now Pat. No. 7,081,819.

(60) Provisional application No. 60/394,241, filed on Jul. 9, 2002.

(51) Int. Cl.

| | | |
|---|---|---|
| *G06F 21/32* | (2013.01) | |
| *G06K 7/10* | (2006.01) | |
| *G06K 19/02* | (2006.01) | |
| H04W 4/80 | (2018.01) | |
| H04W 12/06 | (2021.01) | |
| H04W 12/00 | (2021.01) | |
| H04W 12/08 | (2021.01) | |
| G06Q 20/32 | (2012.01) | |
| G06F 21/31 | (2013.01) | |
| G06F 21/34 | (2013.01) | |
| G06F 21/35 | (2013.01) | |
| H04W 12/77 | (2021.01) | |

(52) U.S. Cl.
CPC ....... *G06K 7/10366* (2013.01); *G06K 19/025* (2013.01); *G06F 21/31* (2013.01); *G06F 21/34* (2013.01); *G06F 21/35* (2013.01); *G06K 7/10* (2013.01); *G06Q 20/3278* (2013.01); *H04M 2203/6009* (2013.01); *H04M 2203/6054* (2013.01); *H04W 4/80* (2018.02); *H04W 12/00* (2013.01); *H04W 12/06* (2013.01); *H04W 12/08* (2013.01); *H04W 12/77* (2021.01)

(58) Field of Classification Search
CPC ..... G06K 7/10366; G06F 19/00; G06F 19/19; G06Q 20/30; G06Q 20/32; G06Q 20/322; G06Q 20/3226; G06Q 20/3227; G06Q 20/3229; G06Q 20/367; G06Q 20/3674; G06Q 20/40; G06Q 20/409; G06Q 20/4093
See application file for complete search history.

(56) References Cited

U.S. PATENT DOCUMENTS

| | | |
|---|---|---|
| 5,590,197 A | 12/1996 | Chen et al. |
| 5,613,012 A * | 3/1997 | Hoffman ............. G06Q 20/02 382/115 |
| 5,627,544 A | 5/1997 | Snodgrass et al. |
| 5,657,008 A | 8/1997 | Bantli |
| 5,742,618 A | 4/1998 | Lowe |
| 5,787,174 A | 7/1998 | Tuttle |
| 5,819,234 A | 10/1998 | Slavin et al. |
| 5,864,580 A | 1/1999 | Lowe et al. |
| 5,874,896 A | 2/1999 | Lowe et al. |
| 5,940,006 A | 8/1999 | MacLellan et al. |
| 5,974,500 A | 10/1999 | Maletsky et al. |
| 6,016,476 A * | 1/2000 | Maes ............. G06Q 20/108 705/18 |
| 6,025,780 A | 2/2000 | Bowers et al. |
| 6,025,784 A | 2/2000 | Mish |
| 6,044,382 A | 3/2000 | Martino |
| 6,049,710 A | 4/2000 | Nillson |
| 6,052,068 A | 4/2000 | Price R-W et al. |
| 6,073,840 A | 6/2000 | Marion |
| 6,089,284 A | 7/2000 | Kaehler et al. |
| 6,098,879 A | 8/2000 | Terranova |
| 6,104,281 A | 8/2000 | Heinrich et al. |
| 6,111,506 A | 8/2000 | Yap et al. |
| 6,140,941 A | 10/2000 | Dwyer et al. |
| 6,157,333 A | 12/2000 | Louagie et al. |
| 6,163,771 A | 12/2000 | Walker et al. |
| 6,167,333 A | 12/2000 | Gehlot |
| 6,175,922 B1 | 1/2001 | Wang |
| 6,182,894 B1 | 2/2001 | Hackett et al. |
| 6,203,952 B1 | 3/2001 | O'Brien et al. |
| 6,211,790 B1 | 4/2001 | Radomsky et al. |
| 6,259,405 B1 | 7/2001 | Stewart |
| 6,268,796 B1 | 7/2001 | Gnadinger et al. |
| 6,269,292 B1 | 7/2001 | Kokubu et al. |
| 6,275,157 B1 | 8/2001 | Mays et al. |
| 6,276,607 B1 | 8/2001 | Sato |
| 6,334,059 B1 | 12/2001 | Stilp et al. |
| 6,340,116 B1 | 1/2002 | Cecil et al. |
| 6,360,208 B1 | 3/2002 | Ohanian et al. |
| 6,388,579 B1 | 5/2002 | Adcox et al. |
| 6,427,504 B1 | 8/2002 | Janssen et al. |
| 6,570,487 B1 | 5/2003 | Steeves |
| 6,570,488 B2 | 5/2003 | Kucharczyk et al. |
| 6,617,961 B1 | 9/2003 | Janssen et al. |
| 6,698,653 B1 | 3/2004 | Diamond et al. |
| 6,753,759 B2 | 6/2004 | Stegmaier et al. |
| 6,758,405 B2 | 7/2004 | Look |
| 6,793,134 B2 | 9/2004 | Clark |
| 6,796,490 B1 | 9/2004 | Drummond |
| 6,848,048 B1 | 1/2005 | Holmes |
| 6,850,147 B2 | 2/2005 | Prokoski et al. |
| 6,894,615 B2 | 5/2005 | Look |
| 6,934,689 B1 | 8/2005 | Ritter et al. |
| 6,934,861 B2 | 8/2005 | Haala |
| 6,950,013 B2 | 9/2005 | Scaman et al. |
| 6,975,834 B1 | 12/2005 | Forster |
| 7,031,946 B1 | 4/2006 | Tamai et al. |
| 7,080,819 B2 | 7/2006 | Tojo |
| 7,081,819 B2 | 7/2006 | Martinez de Velasco Cortina et al. |
| 7,096,363 B2 | 8/2006 | Kon et al. |
| 7,225,337 B2 | 5/2007 | Baessler |
| 7,310,734 B2 | 12/2007 | Boate et al. |
| 7,487,538 B2 | 2/2009 | Mok |
| 7,533,809 B1 | 5/2009 | Robinson et al. |
| 7,671,746 B2 | 3/2010 | Martinez de Velasco Cortina et al. |
| 7,762,470 B2 | 7/2010 | Finn et al. |
| 7,844,505 B1 | 11/2010 | Arneson et al. |
| 7,911,643 B2 | 3/2011 | Yamada et al. |
| 7,980,378 B2 | 7/2011 | Jones et al. |
| 7,987,501 B2 | 7/2011 | Miller et al. |
| 8,004,410 B2 | 8/2011 | Martinez de Velasco Cortina et al. |
| 8,041,815 B2 | 10/2011 | Bahl et al. |
| 8,126,449 B2 | 2/2012 | Beenau et al. |
| 8,237,568 B2 | 8/2012 | Martinez de Velasco Cortina et al. |
| 8,325,044 B2 | 12/2012 | Martinez de Velasco Cortina et al. |
| 8,401,539 B2 | 3/2013 | Beenau et al. |
| 8,548,927 B2 | 10/2013 | Beenau et al. |
| 8,587,436 B2 | 11/2013 | Martinez de Velasco Cortina et al. |
| 8,655,789 B2 | 2/2014 | Bishop et al. |
| 8,766,772 B2 | 7/2014 | Martinez de Velasco Cortina et al. |
| 9,558,385 B2 | 1/2017 | Martinez de Velasco Cortina et al. |

(56) References Cited

U.S. PATENT DOCUMENTS

| | | | |
|---|---|---|---|
| 9,858,566 | B2 | 1/2018 | Mardikar et al. |
| 2001/0044900 | A1 | 11/2001 | Uchida |
| 2002/0010684 | A1 | 1/2002 | Moskowitz |
| 2002/0040327 | A1 | 4/2002 | Owa |
| 2002/0073416 | A1 | 6/2002 | Ramsey Catan |
| 2002/0089434 | A1 | 7/2002 | Ghazarian |
| 2002/0109580 | A1 | 8/2002 | Shreve et al. |
| 2002/0112171 | A1 | 8/2002 | Ginter et al. |
| 2002/0112177 | A1 | 8/2002 | Voltmer et al. |
| 2002/0123325 | A1 | 9/2002 | Cooper |
| 2002/0157029 | A1 | 10/2002 | French et al. |
| 2002/0193142 | A1 | 12/2002 | Stavenow et al. |
| 2002/0194499 | A1 | 12/2002 | Audebert et al. |
| 2003/0004827 | A1* | 1/2003 | Wang ............... G06F 21/606 705/64 |
| 2003/0018522 | A1 | 1/2003 | Denimarck et al. |
| 2003/0019929 | A1 | 1/2003 | Stewart et al. |
| 2003/0055738 | A1 | 3/2003 | Alie |
| 2003/0074317 | A1 | 4/2003 | Hofi |
| 2003/0112120 | A1 | 6/2003 | K. Seifert |
| 2003/0137403 | A1 | 7/2003 | Carrender et al. |
| 2003/0149662 | A1 | 8/2003 | Shore |
| 2003/0200227 | A1 | 10/2003 | Ressler |
| 2004/0044627 | A1* | 3/2004 | Russell ............... G06Q 20/00 705/50 |
| 2004/0049451 | A1* | 3/2004 | Berardi ............... G06Q 20/10 705/39 |
| 2004/0128249 | A1 | 7/2004 | Hoffman |
| 2004/0199469 | A1 | 10/2004 | Barillova et al. |
| 2005/0149764 | A1 | 7/2005 | Bahl et al. |
| 2006/0020558 | A1 | 1/2006 | Bonalle et al. |
| 2006/0204048 | A1 | 9/2006 | Morrison |
| 2007/0022058 | A1 | 1/2007 | Labrou et al. |
| 2007/0198436 | A1 | 8/2007 | Weiss |
| 2010/0094754 | A1 | 4/2010 | Bertran et al. |
| 2010/0095130 | A1 | 4/2010 | Bertran et al. |
| 2010/0265038 | A1 | 10/2010 | Beenau et al. |
| 2014/0164254 | A1 | 6/2014 | Dimmick |
| 2014/0172724 | A1 | 6/2014 | Dua |
| 2016/0019541 | A1 | 1/2016 | Bonalle et al. |

FOREIGN PATENT DOCUMENTS

| | | | |
|---|---|---|---|
| EP | 762332 | A2 | 3/1997 |
| EP | 977145 | A2 | 2/2000 |
| EP | 993999 | A2 | 4/2000 |
| JP | 2002042076 | A | 2/2002 |
| WO | 9843104 | A2 | 10/1998 |
| WO | 2004006165 | A1 | 1/2004 |

OTHER PUBLICATIONS

Extended European Search Report issued by the European Patent Office in related European Application No. 10182033.0 dated Jan. 13, 2012 (7 pages).

Fancher, Carol Hovenga, In Your Pocket Smartcards, IEEE Spectrum, Feb. 2007, (7 pages).

Rakers, Patrick, et al., Secure Contactless Smartcard ASIC with DPA Protection, IEEE Journal Of Solid-State Circuits, vol. 36, No. 3, Mar. 2001, (7 pages).

Official Action in Japanese Patent Application No. 2004-519130 dated May 12, 2009, (10 pages).

Anonymous, Read Write RFID Offers Standalone Advantages, Security, Aug. 1996, (1 page).

Mohammed et al., Smart Card Technology Past Present and Future, International Journal of The Computer, the Internet and Managemetn vol. 12 #1 2004 (11 pages).

Atmel Corporation, Understanding the Requirements of ISO IEC 14443, 2005 (28 pages).

Ewa Syta, S. K. (2010). RFID-based Authentication Middleware for Mobile Devices. IEEE, 1-10. Retrieved from http://www.cs.ccsu.edu/-stan/research/pervasive/pubs/hicss201 Orfidam .pdf (10 pages).

U.S. Notice of Allowance dated Jul. 24, 2019 received in U.S. Appl. No. 16/051,751 (16 pages).

U.S. Notice of Allowance dated Jun. 4, 2019 received in U.S. Appl. No. 16/051,751 (22 pages).

U.S. Office Action dated Oct. 24, 2019 received in U.S. Appl. No. 14/724,593. (29 pages).

U.S. Notice of Allowance dated May 28, 2019 received in U.S. Appl. No. 14/659,502 (31 pages).

U.S. Applicant Interview Summary dated Nov. 5, 2019 received in U.S. Appl. No. 14/639,034 (4 pages).

U.S. Applicant Interview Summary dated Nov. 1, 2019 received in U.S. Appl. No. 14/639,034 (7 pages).

Response to Office Action filed on Oct. 31, 2019 for U.S. Appl. No. 14/639,034.

U.S. Office Action dated Aug. 1, 2019 received in U.S. Appl. No. 14/639,034 (22 pages).

U.S. Applicant Interview Summary dated Dec. 20, 2019 received in U.S. Appl. No. 14/585,057 (3 pages).

U.S. Office Action dated Sep. 19, 2019 received in U.S. Appl. No. 14/585,057 (21 pages).

Advisory Action dated Dec. 16, 2019 received in U.S. Appl. No. 14/321,781 (7 pages).

Response to Office Action dated Dec. 3, 2019 for U.S. Appl. No. 14/321,781 (30 pages).

U.S. Office Action dated Oct. 4, 2019 received in U.S. Appl. No. 14/321,781. (21 pages).

Response to Office Action filed on Jun. 7, 2019 for U.S. Appl. No. 14/321,781. (31 pages).

U.S. Office Action dated Feb. 4, 2019 received in U.S. Appl. No. 16/051,751.

Response to Office Action filed on Apr. 30, 2019 in U.S. Appl. No. 16/051,751.

U.S. Applicant Interview Summary dated Apr. 22, 2019 received in U.S. Appl. No. 16/051,751.

Notice of Appeal dated Apr. 10, 2019 filed in U.S. Appl. No. 14/724,593.(4 pages).

U.S. Office Action dated Jan. 11, 2019 received in U.S. Appl. No. 14/724,593. (48 pages).

Response to Office Action filed on Sep. 11, 2018 for U.S. Appl. No. 14/724,593. (24 pages).

U.S. Office Action dated Jul. 12, 2018 received in U.S. Appl. No. 14/724,593. (45 pages).

Response to Office Action filed on Jan. 10, 2018 for U.S. Appl. No. 14/724,593. (17 pages).

U.S. Applicant Interview Summary dated Dec. 6, 2017 received in U.S. Appl. No. 14/724,593. (3 pages).

U.S. Office Action dated Jul. 28, 2017 received in U.S. Appl. No. 14/724,593. (36 pages).

Response to Office Action filed on Apr. 26, 2017 for U.S. Appl. No. 14/724,593. (10 pages).

U.S. Office Action dated Feb. 17, 2017 received in U.S. Appl. No. 14/724,593. (28 pages).

Pre-Brief Appeal Conference Decision dated Dec. 12, 2016 and received in U.S. Appl. No. 14/724,593. (5 pages).

Pre-Appeal Brief Request for Review, Notice of Appeal, and Pre-Brief Brief filed on Nov. 7, 2016 for U.S. Appl. No. 14/724,593. (14 pages).

U.S. Office Action dated May 6, 2016 received in U.S. Appl. No. 14/724,593. (43 pages).

Response to Office Action filed on Jan. 7, 2016 for U.S. Appl. No. 14/724,593. (17 pages).

U.S. Office Action dated Aug. 4, 2015 received in U.S. Appl. No. 14/724,593. (80 pages).

Patent Board Decision dated May 10, 2019 received in U.S. Appl. No. 14/659,502. (11 pages).

Reply Brief filed Sep. 26, 2017 for U.S. Appl. No. 14/659,502. (13 pages).

Examiner's Answer to Appeal Brief dated Jul. 26, 2017 received in U.S. Appl. No. 14/659,502. (28 pages).

Appeal Brief filed Apr. 18, 2017 for U.S. Appl. No. 14/659,502. (48 pages).

Pre-Brief Appeal Conference Decision dated Nov. 30, 2016 and received in U.S. Appl. No. 14/659,502. (2 pages).

(56) References Cited

OTHER PUBLICATIONS

Pre-Appeal Brief Request for Review, Notice of Appeal, and Pre-Brief Brief filed on Nov. 16, 2016 for U.S. Appl. No. 14/659,502. (9 pages).
U.S. Office Action dated May 16, 2016 received in U.S. Appl. No. 14/659,502. (41 pages).
Response to Office Action filed on Dec. 23, 2015 for U.S. Appl. No. 14/659,502. (17 pages).
U.S. Office Action dated Jun. 22, 2015 received in U.S. Appl. No. 14/659,502. (37 pages).
U.S. Office Action dated May 29, 2015 received in U.S. Appl. No. 14/639,034. (32 pages).
Appeal Brief filed Jan. 30, 2017 for U.S. Appl. No. 14/639,034. (17 pages).
Pre-Brief Appeal Conference Decision dated Jul. 21, 2016 and received in U.S. Appl. No. 14/639,034. (2 pages).
Pre-Appeal Brief Request for Review, Notice of Appeal, and Pre-Brief Brief filed on Jun. 30, 2016 for U.S. Appl. No. 14/639,034. (10 pages).
U.S. Office Action dated Dec. 30, 2015 received in U.S. Appl. No. 14/639,034. (28 pages).
Response to Office Action filed on Nov. 30, 2015 for U.S. Appl. No. 14/639,034. (15 pages).
Patent Board Decision dated Mar. 4, 2019 for U.S. Appl. No. 14/585,057. (11 pages).
Reply Brief filed Aug. 21, 2017 in the U.S. Appl. No. 14/585,057 (11 pages).
Examiner's Answer to Appeal Brief dated Jun. 21, 2017 received in U.S. Appl. No. 14/585,057 (24 pages).
Appeal Brief filed Feb. 9, 2017 in U.S. Appl. No. 14/585,057 (16 pages).
Pre-Brief Appeal Conference decision dated Nov. 30, 2016 in U.S. Appl. No. 14/585,057 (2 pages).
Notice of Appeal & Pre-Brief Conference request filed Nov. 9, 2016 in U.S. Appl. No. 14/585,057 (4 pages).
U.S. Office Action dated May 9, 2016 received in U.S. Appl. No. 14/585,057. (34 pages).
Response to Office Action filed on Jan. 7, 2016 for U.S. Appl. No. 14/585,057. (13 pages).
U.S. Office Action dated Oct. 7, 2015 received in U.S. Appl. No. 14/585,057. (45 pages).
U.S. Office Action dated Mar. 7, 2019 received in U.S. Appl. No. 14/321,781. (19 pages).
Response to Office Action filed on Aug. 14, 2018 for U.S. Appl. No. 14/321,781. (28 pages).
U.S. Office Action dated Mar. 22, 2018 received in U.S. Appl. No. 14/321,781. (37 pages).
Response to Office Action filed on Dec. 5, 2017 for U.S. Appl. No. 14/321,781. (16 pages).
U.S. Office Action dated Jun. 5, 2017 received in U.S. Appl. No. 14/321,781. (51 pages).
Response to Office Action filed on Nov. 18, 2016 for U.S. Appl. No. 14/321,781. (25 pages).
U.S. Office Action dated May 19, 2016 received in U.S. Appl. No. 14/321,781. (39 pages).
Response to Office Action filed on Dec. 28, 2015 for U.S. Appl. No. 14/321,781. (32 pages).
U.S. Office Action dated Jun. 24, 2015 received in U.S. Appl. No. 14/321,781. (37 pages).
Notice of Allowance and Examiner Initiated Interview Summary dated Apr. 8, 2020 received in U.S. Appl. No. 14/724,593 (48 pages).
U.S. Applicant Interview Summary dated Jan. 22, 2020 received in U.S. Appl. No. 14/724,593.(7 pages).
Appeal Brief filed Jun. 10, 2019 filed in U.S. Appl. No. 14/724,593. (46 pages).
Notice of Allowance and Examiner Initiated Interview Summary dated Apr. 6, 2020 received in U.S. Appl. No. 14/639,034(38 pages).
U.S. Applicant Interview Summary dated Jan. 16, 2020 received in U.S. Appl. No. 14/639,034 (7 pages).
Response to Office Action filed Jan. 13, 2020 for U.S. Appl. No. 14/639,034. (8 pages).
U.S. Office Action dated Jan. 8, 2020 received in U.S. Appl. No. 14/639,034 (14 pages).
Response to Office Action filed Apr. 18, 2019 for U.S. Appl. No. 14/639,034. (15 pages).
U.S. Office Action dated Mar. 1, 2019 received in U.S. Appl. No. 14/639,034.(20 pages).
Response to Office Action filed Jul. 23, 2018 received in U.S. Appl. No. 14/639,034.(30 pages).
Applicant initiated Interview Summary dated Jul. 12, 2018 received in U.S. Appl. No. 14/639,034 (11 pages).
U.S. Office Action dated Mar 22, 2018 received in U.S. Appl. No. 14/639,034. (37 pages).
Response to Office Action filed Dec. 12, 2017 filed in U.S. Appl. No. 14/639,034.(13 pages).
U.S. Office Action dated Jun. 16, 2017 received in U.S. Appl. No. 14/639,034 (25 pages).
U.S. Applicant Interview Summary dated Jan. 22, 2020 received in U.S. Appl. No. 14/585,057 (7 pages).
Response to Office Action filed on Jan. 17, 2020 for U.S. Appl. No. 14/585,057 (36 pages).
Response to Office Action filed on Apr. 30, 2019 for U.S. Appl. No. 14/585,057 (20 pages).
Notice of Allowance and Examiner Initiated Interview Summary dated Apr. 2, 2020 received in U.S. Appl. No. 14/321,781(41 pages).
U.S. Applicant Interview Summary dated Jan. 16, 2020 received in U.S. Appl. No. 14/321,781 (7 pages).
Response to Office Action filed on Jan. 13, 2020 for U.S. Appl. No. 14/321,781.(28 pages).
U.S. Office Action dated Jan. 8, 2020 received in U.S. Appl. No. 14/321,781.(21 pages).
Alliance, S. C, Gemalto.com. Smart Cards and Biometrics in Privacy-Sensitive Secure Personal Identification Systems, Princeton Junction, NJ, USA. Retrieved from https://www.gemalto.com/press-site/gernplus/2002/security/Smart_Card_Biometric_paper.pdf (2002) (22 pages).
Notice of Allowance and Examiner Initiated Interview Summary dated Jun. 4, 2020 received in U.S. Appl. No. 14/724,593 (48 pages).
Amendment after Notice of Allowance and Applicant's Summary of Interview dated May 28, 2020 in U.S. Appl. No. 14/724,593.
Notice of Allowance dated May 27, 2020 received in U.S. Appl. No. 14/639,034.
Amendment after Notice of Allowance dated May 28, 2020 in U.S. Appl. No. 14/321,781.
Corrected Notice of Allowability dated May 5, 2020 in U.S. Appl. No. 14/321,781.
U.S. Office Action dated Apr. 20, 2020 received in U.S. Appl. No. 14/585,057.
Response to Office Action filed Jun. 17, 2020 in U.S. Appl. No. 14/585,057.
Interview Summary dated Jun. 19, 2020 in U.S. Appl. No. 14/585,057.
Notice of Allowance dated Aug. 11, 2020 in U.S. Appl. No. 14/585,057 (24 pages).
Petition for Inter Partes Review Under 37 C.F.R. 42.100, Petition for Inter Partes Review of U.S. Pat. No. 8,237,568, Feb. 7, 2015, 66 pages.
U.S. Notice of Allowance dated Dec. 3, 2014 received in U.S. Appl. No. 14/028,469.
Plaintiff's Memorandum in Support of Its Motion for Preliminary Injunction, Case 1:11-cv-00672-LPS-MPT Document 31 Filed Dec. 6, 2011 p. 1 of 45 PageID #: 255, 45 pages.
Preliminary Amendment filed on Aug. 28, 2018 in U.S. Appl. No. 16/051,751.
Reply Declaration of Daniel Van Der Weide, in the United States District Court for the District of Delaware, Case 1:11-cv-00672-LPS-MPT Document 82 Filed Apr. 27, 2012 p. 1 of 39 PageID #: 2505, 524 pages (inclusive of exhibits).
Report and Recommendation, Case 1:11-cv-00672-LPS-MPT Document 94 Filed Jun. 18, 2012 p. 1 of 72 PageID #: 3539, 72 pages.

(56) References Cited

OTHER PUBLICATIONS

The Kapsch Defendants' Answer, Affirmative Defenses, and Counterclaims, Case 1:13-cv-02052-LPS Document 46 Filed Feb. 25, 2015 p. 1 of 126 PageID #: 661, 126 pages.
U.S. Notice of Allowance dated Apr. 11, 2014 received in U.S. Appl. No. 14/022,135.
United States Court of Appeals for the Federal Circuit. *Neology, Inc.*, Appellant, v. *International Trade Commission*, Appellee | Kapsch Trafficcom USA, Inc., Kapsch Trafficcom Holding Corp., Kapsch Trafficcom Canada Inc., Star Systems International Ltd., Star RFID Co., Ltd., Intervenors. 2018-1338. Appeal from the United States International Trade Commission in Investigation No. 337-TA-979. Decided: Apr. 19, 2019. 13 pages.
United States Court of Appeals for the Federal Circuit. *Neology, Inc.*, Appellant, v. *Kapsch Trafficcom IVHS Inc., Kapsch Trafficcom Holding Corp.*, Appellees. 2017-1228, 2017-1229. Appeals from the United States Patent and Trademark Office, Patent Trial and Appeal Board in Nos. IPR2015-00818, IPR2015-00819. "Judgment." Jun. 6, 2018. 2 pages.
United States International Trade Commission. Washington, D.C. In the matter of Certain Radio Frequency Identification ("RFID") Products and Components Thereof. Inv. No. 337-TA-979. "Initial Determination on Violation of Section 337 and Recommended Determination of Remedy and Bond." Jun. 22, 2017. 337 pages. Public Version.
United States International Trade Commission. Washington, D.C. In the matter of Certain Radio Frequency Identification ("RFID") Products and Components Thereof. Investigation No. 337-TA-979. "Commission Opinion." Oct. 30, 2017. 53 pages.
United States International Trade Commission. Washington, D.C. In the matter of Certain Radio Frequency Identification ("RFID") Products and Components Thereof. Investigation No. 337-TA-979. "Notice of Commission Determination to Review-in-Part the Final Initial Determination; Schedule for Filing Written Submissions on the Issues Under Review." Aug. 16, 2017. 5 pages.
United States Patent and Trademark Office. Before the Patent Trial and Appeal Board. *Kapsch Trafficcom IVHS Inc. and Kapsch Trafficcom Holding Corp.*, Petitioner, v. *Neology, Inc.*, Patent Owner. Case IPR2015-00818. Patent 8,237,568 B2. "Final Written Decision 35 U.S.C. § 318(a) and 37 C.F.R. § 42.73." Paper 40. Entered Sep. 13, 2016. 38 pages.
United States Patent and Trademark Office. Before the Patent Trial and Appeal Board. *Kapsch Trafficcom IVHS Inc. and Kapsch Trafficcom Holding Corp.*, Petitioner, v. *Neology, Inc.*, Patent Owner. Case IPR2015-00819 Patent 8,325,044 B2. "Final Written Decision. 35 U.S.C. § 318(a) and 37 C.F.R. § 42.73." Paper 42. Entered Sep. 13, 2016. 49 pages.
United States Patent and Trademark Office. Before the Patent Trial and Appeal Board. *Kapsch Trafficcom IVHS Inc., Kapsch Trafficcom IVHS Holding Corp., Kapsch Trafficcom IVHS Technologies Holding Corp., Kapsch Trafficcom U.S. Corp., and Kapsch Trafficcom Holding Corp.*, Petitioner, v. *Neology, Inc.*, Patent Owner. Case IPR2015-00819. Patent 8,325,044 B2. "Decision. Institution of Inter Partes Review. 37 C.F.R. § 42.108." Paper 13. Entered Sep. 14, 2015. 25 pages.
United States Patent and Trademark Office. Before the Patent Trial and Appeal Board. *Kapsch Trafficcom IVHS Inc., Kapsch Trafficcom IVHS Holding Corp., Kapsch Trafficcom IVHS Technologies Holding Corp., Kapsch Trafficcom U.S. Corp., and Kapsch Trafficcom Holding Corp.*, Petitioner, v. *Neology, Inc.*, Patent Owner. Case IPR2015-00818. Patent 8,237,568 B2. "Decision. Institution of Inter Partes Review. 37 C.F.R. § 42.108." Paper 11. Entered Sep. 14, 2015. 25 pages.
United States Patent and Trademark Office. Before the Patent Trial and Appeal Board. *Kapsch Trafficcom IVHS Inc., Kapsch Trafficcom IVHS Holding Corp., Kapsch Trafficcom IVHS Technologies Holding Corp., Kapsch Trafficcom U.S. Corp., and Kapsch Trafficcom Holding Corp.*, Petitioner, v. *Neology, Inc.*, Patent Owner. Case IPR2015-00815. Patent 8,587,436 B2. "Decision Denying Institution of Inter Partes Review. 37 C.F.R. § 42.108." Paper 11. Entered Sep. 14, 2015. 18 pages.
Decision Denying Institution of Inter Partes Review 37 C.F.R. 42.108, Case IPR2015-00815 Patent 8,587,436 B2, 18 pages.
Decision Institution of Inter Partes Review 37 C.F.R. 42.108. Case IPR2015-00818 Patent 8,237,568 B2, 25 pages.
In The Matter of Certain Radio Frequency Identification Products and Components Thereof, Dated Feb. 22, 2013, Sterne Kessler Goldstein Fox, Statement of Public Interest, 48 pages.
Initial Determination Granting Joint Motion to Terminate the Investigation, dated Jun. 19, 2013, for Certain Radio Frequency Identification (RFID) Products and Components, 49 pages.
Initial Determination on Violation of Section 337 and Recommended Determination on Remedy and Bond. In the Matter of Certain Radio Frequency Identification ("RFID") Products and Components Thereof Dated Jun. 22, 2017 (333 pages).
Plaintiff Neology, Inc's Reply in Support of Motino for Preliminary Injunction, CA No. 11-672-LPS-MPT. Dated Apr. 9, 2012, Case 1:11-cv-00672-LPS-MPT Document 73 Filed Apr. 16, 2012 p. 1 of 26 PageID #: 1142 Kapsch (26 pages).
Publisher: Austrian Working Group for Corporate Governance c/o Johannesgasse 5, 1010 Vienna Vienna, Jan. 2015, 78 pages.
Response to Office Action filed on Feb. 3, 2014 for U.S. Appl. No. 14/022,135.
Response to Office Action filed on Feb. 3, 2014 for U.S. Appl. No. 14/028,469.
Response to Office Action filed on Jun. 13, 2014 for U.S. Appl. No. 14/028,469.
Response to Office Action filed on Mar. 14, 2014 for U.S. Appl. No. 14/022,135.
Response to Office Action filed on Mar. 14, 2014 for U.S. Appl. No. 14/028,469.
Response to Office Action filed on May 2, 2017 for U.S. Appl. No. 15/372,317.
Response to Office Action filed on Oct. 14, 2014 for U.S. Appl. No. 14/028,469.
Road Transport and Traffic Telematics (RTTT) Electronic Fee Collection (EFS), Kapsch-1008, ENV ISO 14906, Vornorm, 72 pages, 1998.
Supplemental response to Office Action filed on Oct. 31, 2014 for U.S. Appl. No. 14/028,469.
U.S. Office Action dated Apr. 3, 2014 received in U.S. Appl. No. 14/028,469.
U.S. Office Action dated Aug. 18, 2014 received in U.S. Appl. No. 14/028,469.
U.S. Office Action dated Dec. 5, 2013 received in U.S. Appl. No. 14/022,135.
U.S. Office Action dated Dec. 6, 2013 received in U.S. Appl. No. 14/028,469.
U.S. Office Action dated Feb. 2, 2017 received in U.S. Appl. No. 15/372,317.
U.S. Office Action dated Jul. 9, 2014 received in U.S. Appl. No. 14/028,469.
U.S. Office Action dated Mar. 6, 2014 received in U.S. Appl. No. 14/028,469.
U.S. Office Action dated Mar. 7, 2014 received in U.S. Appl. No. 14/022,135.
Complaint for Patent Infringement, Demand for Jury Trial, Case 1:11-cv-00672-UNA Document 1 Filed Jul. 29, 2011 p. 1 of 11 PageID #: 1, 11 pages.
Declaration of Franz Semmernegg Under 37 C.F.R. 1.68 IPR2015-0808 (U.S. Pat. No. 6,229,443)IPR2015-0814 (U.S. Pat. No. 6,690,264)IPR2015-0815 (U.S. Pat. No. 8,587,436)IPR2015-0818 (U.S. Pat. No. 8,237,568)IPR2015-0819 (U.S. Pat. No. 8,325,044), 7 pages.
Declaration of Jack Goldberg in Response to Declaration of Daniel Van Der Weide and in Support of Plaintiffs Motion for Preliminary Injunction, case 1:11-cv-00672-LPS-MPT Document 74 Filed Apr. 16, 2012 p. 1 of 69 PageID #: 1168, 85 page.
Declaration of Jack Goldberg in Support of Plaintiffs Motion for Preliminary Injunction, Case 1:11-cv-00672-LPS-MPT Document 28 Filed Dec. 2, 2011 p. 1 of 47 PageID #: 206, 47 pages.

(56) References Cited

OTHER PUBLICATIONS

Patent Owner Neology, Inc.'s Response to Petition for Inter Partes Review Under 35 U.S.C. 316 and 37 C.F.R. 42.220, for U.S. Pat. No. 8,237,568, IPR Case No. IPR2015-0818, 47 pages.
Declaration of Nathan S. Mammen, for U.S. Pat. No. 8,237,568 B2, Feb. 27, 2015, 5 pages.
Defendants' Answer and Counterclaims to Plaintiff's Complaint for Patent Infringement, Case 1:11-cv-00672-LPS Document 10 Filed Oct. 21, 2011 p. 1 of 22 PageID #: 144, 22 pages.
Defendants' Memorandum in Response to Plaintiff's Motion for Preliminary Injunction, Case 1:11-cv-00672-LPS-MPT Document 58 Filed Feb. 20, 2012 p. 1 of 55 PageID #: 467, 55 pages.
Patent Owner Neology, Inc.'s Preliminary Response Under 35 U.S.C. 313 and 37 C.F.R. 42.107, for U.S. Pat. No. 8,237,568, IPR Case No. IPR2015-0818, 28 pages.
Exhibit 1, Case 1:11-cv-00672-LPS-MPT Document 57-1 Filed Feb. 17, 2012 p. 1 of 34 PageID #: 416, 34 pages.
Exhibit 2, Case 1:11-cv-00672-LPS-MPT Document 57-2 Filed Feb. 17, 2012 p. 1 of 9 PageID #: 450, 9 pages.
Exhibit 3, Case 1:11-cv-00672-LPS-MPT Document 57-3 Filed Feb. 18, 2012 p. 1 of 8 PageID #: 459, 8 pages.

\* cited by examiner

| Original IP Packet | IP header | TCP header | Data header | | |
|---|---|---|---|---|---|
| Transport mode Protected packet | IP header | IPSec header | TCP header | Data header | |
| Tunnel mode Protected packet | IP header | IPSec header | IP header | TCP header | Data header |

FIG. 3A

SYSTEM AND METHOD FOR PROVIDING SECURE IDENTIFICATION SOLUTIONS

RELATED APPLICATIONS INFORMATION

This application is a continuation of application Ser. No. 16/051,751, filed on Aug. 1, 2018, now U.S. Pat. No. 10,445,719 issued Oct. 15, 2019, which is a continuation of application Ser. No. 15/707,949 filed on Sep. 18, 2017, now U.S. Pat. No. 10,061,949 issued Aug. 28, 2018 which is a continuation of application Ser. No. 15/372,325 filed on Dec. 7, 2016, now U.S. Pat. No. 9,922,217 issued Mar. 20, 2018, which is a continuation of application Ser. No. 14/084,565, filed on Nov. 19, 2013, now U.S. Pat. No. 9,558,385 issued on Jan. 31, 2017, which in turn is a continuation of Ser. No. 13/350,665, filed on Jan. 13, 2012, now U.S. Pat. No. 8,587,436, issued on Nov. 19, 2013, which is a continuation of U.S. patent application Ser. No. 13/175,768, filed on Jul. 1, 2011, now U.S. Pat. No. 8,237,568, issued on Aug. 7, 2012, which is a continuation of U.S. Ser. No. 12/688,666, filed on Jan. 15, 2010, now U.S. Pat. No. 8,004,410, issued on Aug. 23, 2011, which is a continuation of U.S. application Ser. No. 11/279,912, filed on Apr. 17, 2006, now U.S. Pat. No. 7,671,746, issued on Mar. 2, 2010, which is a continuation of U.S. application Ser. No. 10/615,026, filed on Jul. 9, 2003, now U.S. Pat. No. 7,081,819, issued on Jul. 25, 2006, which in turn claims the benefit under 35 U.S.C. 119(e) to U.S. Provisional Patent Application Ser. No. 60/394,241, filed Jul. 9, 2002, all of which are incorporated herein by reference in their entirety as if set forth in full.

BACKGROUND OF THE INVENTION

Field of the Invention

The present invention generally relates to a system and method for providing secure identification solutions, and specifically to a system and method for verifying and tracking identification information.

SUMMARY OF THE INVENTION

The present invention provides a method and system for verifying and tracking identification information. In an embodiment of the invention, a system for delivering security solutions is provided that includes at least one of the following: a radio frequency (RF) identification device, an identification mechanism (e.g., a card, sticker), and an RF reader/writer. The system and method can be used in numerous embodiments, including, but not limited to:

An RF Registration Item (e.g., License Plate) and Method of Use.
An RF Identification Mechanism (e.g., Passport) and Method of Use.
An RF Communications Device (e.g., Cellular Telephone) and Method of Use.
A System and Method of Border Crossing Control.
A System and Method for Limiting Software Downloads to Authorized Users.
A System and Method for Airport Security.

The embodiments of the present invention are discussed below. Those experienced in the art will see that multiple features of certain embodiments described below can be incorporated into other embodiments both described and not described below.

The present invention is not limited to the above embodiments. Additional advantages and novel features of the invention will be set forth in part in the Description that follows, and in part will become more apparent to those skilled in the art upon examination of the following or upon learning by practice of the invention.

BRIEF DESCRIPTION OF THE FIGURES

FIGS. 3A-3B and 19-21 illustrate a system and method for limiting software downloads to authorized users, in an embodiment of the present invention.

DESCRIPTION OF THE INVENTION

I. General RF Identification System and Method of Use

Figure 1:
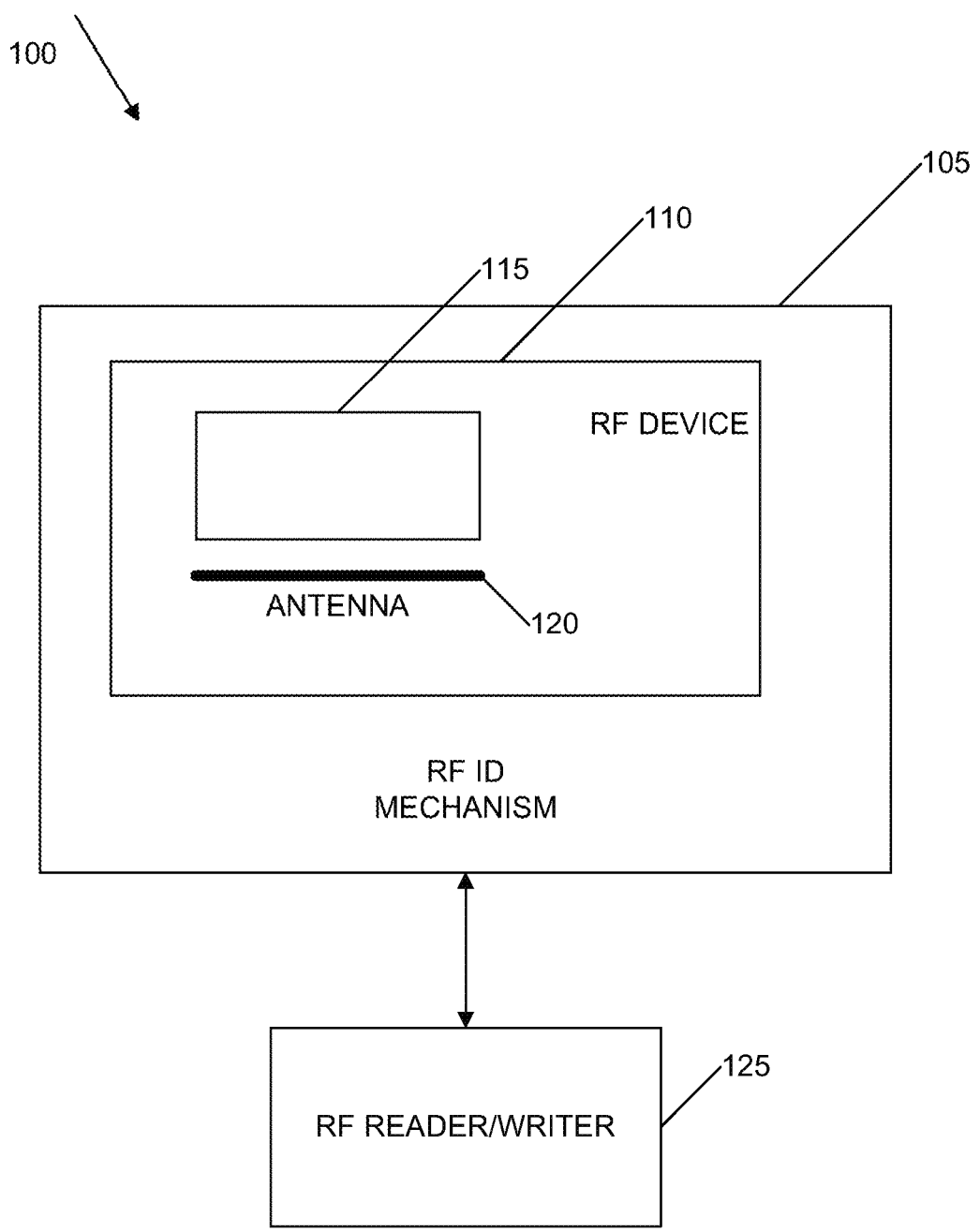
FIGS. 1, 2 and 4 illustrate the general invention, according to one embodiment of the present invention.

FIG. 1 illustrates an overview system diagram 100, according to one embodiment of the present invention. This embodiment comprises an RF device 110 connected to or embedded on an RF identification mechanism 105, and an RF reader/writer 125. The RF device 110 includes a chip 115 and an RF antenna 120.

A. RF Device

Figure 2:
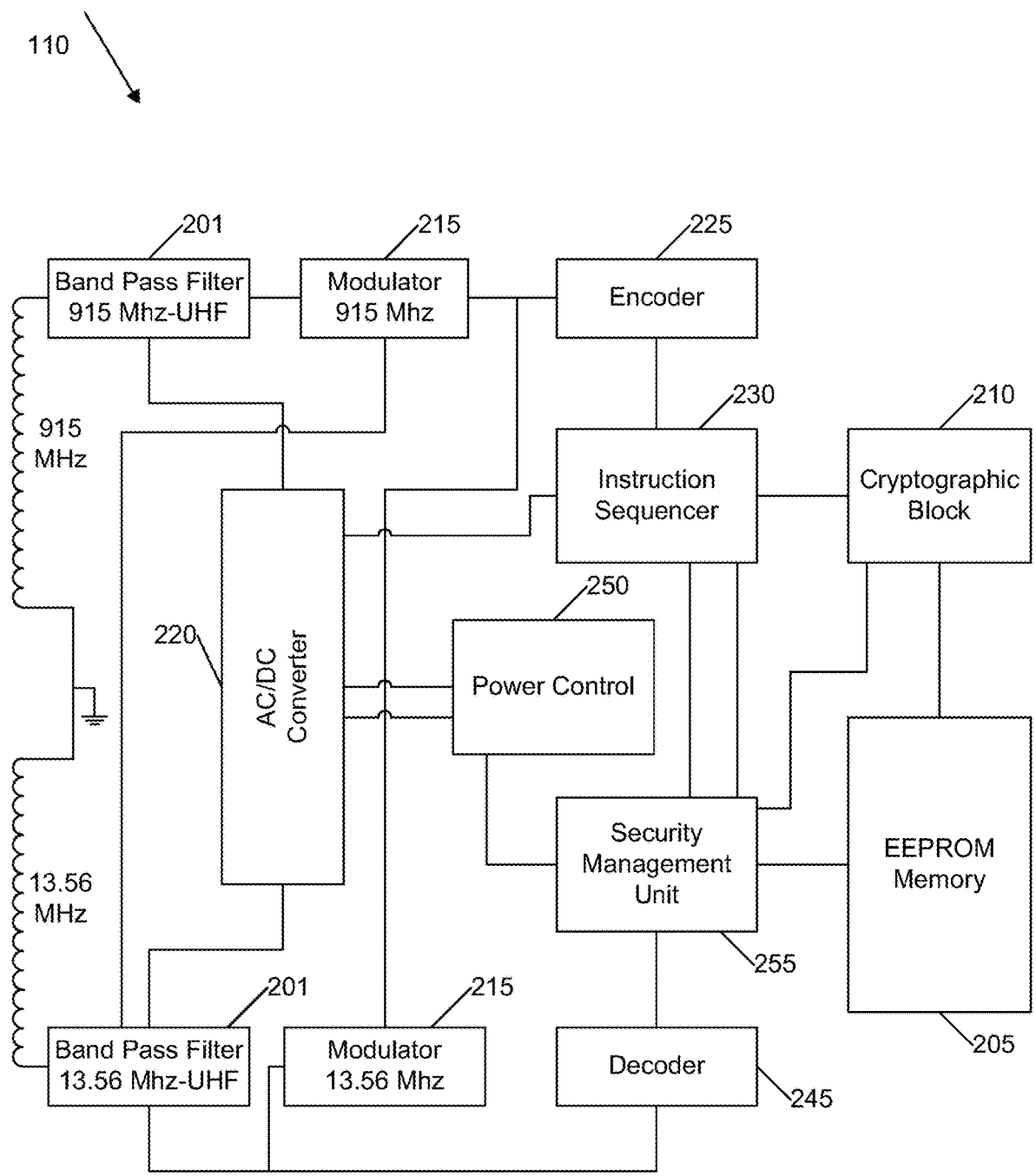

FIG. 2 illustrates RF device 110, according to one embodiment of the present invention. The RF device includes a chip and an RF antenna. The RF device allows electronic identification via the reading of data stored in the chip in a contactless mode.

Figure 5:
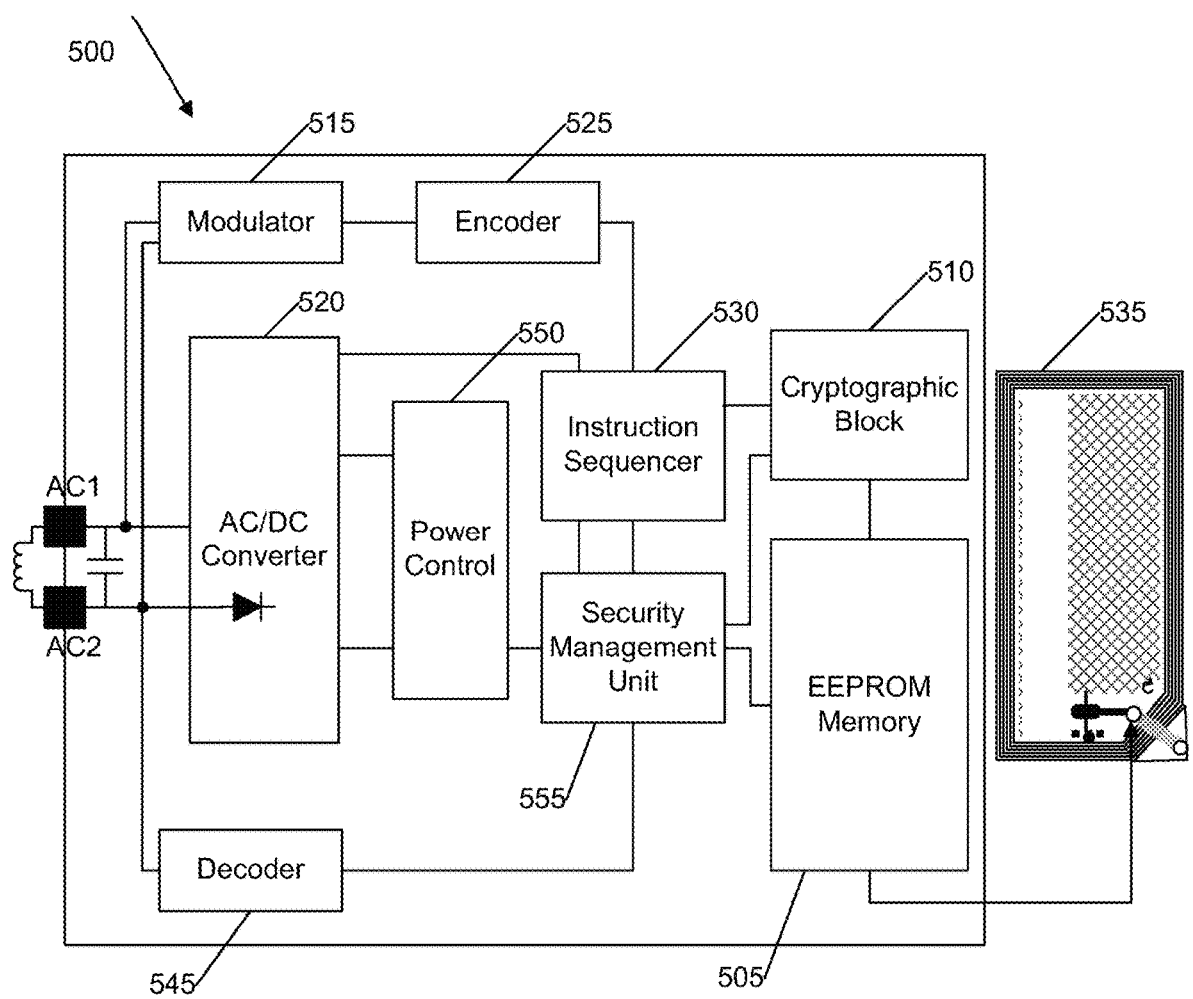
FIGS. 5-8 illustrate the RF registered item and method of use, in an embodiment of the present invention.

FIG. 5 illustrates a dual frequency RF device 110, according to one embodiment of the present invention. Those experienced in the art will see that a one frequency or multiple (more than two) frequency RF device can also be used. The RF device includes the following components: A modulator 215 is a device that receives baseband signals from an antenna. An AC/DC converter 220 is a device that receives an alternating current (AC) and converts it to direct current (DC). An encoder 225 is a device for encoding information received so that it may be utilized by another device or protocol. A decoder 245 is a device that decodes information from the encoder output so it may be used by another device or display. A power control 250 is a device which regulates voltage and current to protect an apparatus from both power surges and low power. An instruction sequencer 230 is a device that queues instructions to be sent to the chip's internal memory. A security management unit 255 is a device that checks and validates the cryptographic keys that will be sent to the cryptographic block. A cryptographic block 210 is a device that stores the security keys. These keys are checked and validated to grant or deny access to the memory chip. EEPROM memory 205 stores data. Information can be read and written from or to this device.

A more detailed description of an RF device can be found in U.S. patent application Ser. No. 10/118,092 filed 9 Apr. 2002; PCT Patent Application PCT/IB02/01439, filed 30

Apr. 2002, which are herein incorporated by reference. Additional information on the RF device can be found in the accompanying documents.

B. RF Identification Mechanism

Numerous features of RF identification mechanism are utilized in one embodiment of the present invention. In this embodiment, the RF device is embedded in the RF identification mechanism. One example of an RF identification mechanism is a card, and the description below refers to the identification mechanism as a card in several examples. However, those experienced in the art will recognize that multiple other embodiments of the identification mechanism are possible, including, but not limited to: a card, a cellular phone, and a personal digital assistant (PDA).

There are a variety of ways to make identification cards that are resistant to fraud and counterfeiting. In one embodiment, the present invention incorporates numerous security features, as explained below.

C. Features of Secure Identification Mechanisms

The present invention offers a variety of solutions for making secure and durable identification mechanisms resistant to fraud and counterfeiting. The following features help make the identification card more secure. These features are only examples, and those experienced in the art will see that the present invention is not limited to these features and that many other features can be incorporated.

In one embodiment of the present invention, at least one of the following features is incorporated: visible features, machine readable features, and proprietary substrate based features. Visible features require only the human eye to detect the security features. Machine readable features require special hardware (e.g., an ultraviolet light source, magnetic reader) to detect the security features. Proprietary substrate based features are security features incorporated within a plastic substrate.

In one embodiment of the present invention, at least one of the following characteristics are present relative to the identification mechanism: it is extremely difficult to duplicate; it is tamper proof, it is recognizable either visually or utilizing a machine readable device; it is durable enough to withstand harsh environments; it is produced by specialized, difficult to obtain production equipment; it can be machine readable; and cost savings are realized by volume production of the identification mechanism.

Security features curb petty, semiprofessional and professional counterfeiters by creating features that are highly difficult to reproduce. For example, the ready accessibility of dye sublimation card printers, color scanners, color printers, heat sources (e.g., hair dryers), and color photo copiers make it relatively easy to reproduce ordinary photo identification cards. In one embodiment, the present invention, therefore, utilizes images and texts that cannot be scanned or photocopied without noticeable distortion, or cannot be recreated without highly sophisticated and expensive equipment.

Security Features. In one embodiment, the present invention can incorporate at least one of the following security features:

Tamper Proof Material. This material consists of metalized polyester treated with a chemical that will not allow an auto adhesive hologram to be transferred from one document to another one. It will self-destruct by any attempt at transfer.

Bidi-Tri-Dimensional at Three Levels. This material must be created in an optical table by a qualified holographer and with a combination of design and dot-matrix effects created by precise digital means allow identification of the document's authenticity.

Hidden Images. A hologram can contain a hidden image that cannot be detected with the naked eyes. The hidden image can be identified by shooting a laser at 45 degrees. The reflection shows a spectrum of a text shield or design. A special lens to protect the eye from laser damage can be used.

Dot-Matrix. A dot-matrix 1,000 dots per inch (DPI) effect is created in a computer and comprises engraving dots with a laser in a specific angle which a minimum density of 1200 to 2000 DPI's. It allows printing of micro text contained within a hologram with great precision and creates very precise 2D and 3D effects.

Hot Stamping. Hot stamping places a hologram on a document by thermal transfer. This hologram will interlace with a paper substrate and will not allow a hologram to be transferred from one document to another.

Moire Pattern. The moire pattern is a design-based pattern which superimposes two patterns with non-identical spatial frequencies. The effect is visually detected after utilizing a normal photocopier to reproduce the original pattern. The reproduced pattern induces a "moire" or aliasing which immediately suggests the reproduced image is counterfeit. The original is produced utilizing digital image technology which differs from normal photocopy technology. This effectively "tricks" the photocopier and reveals the moire in the reproduced pattern.

Hot Stamp Metalized Hologram. This feature is a visual/substrate-based feature which can also be machine readable. It uses a special metalized hologram (e.g., as found on various currencies) or a holographic hot stamp (e.g., that is non-machine readable). This feature comprises special stripes placed within the card laminations and visible to the eye. These holograms can be proprietary in order to limit the availability to counterfeiters. The metalized holograms can also be machine readable to verify authenticity. The security of this feature is high because to duplicate it, a counterfeiter must have access to both the card manufacturing equipment and the source of materials, which are both difficult to obtain.

Microprint: Offset Printed, Visual/Machine-Readable Text of Particular Size. The text is indecipherable without the use of a reading lens, and is usually incorporated as a single line. This feature is used to print misspelled words to fool counterfeiters who often assume complete and correctly spelled microprint. The offset printed text is located under a translucent lamination to protect it from abrasion. This feature is difficult to produce with clarity and resolution using a photocopier, scanner, or dye sublimation printer.

Microprint: Visual/Machine-Readable Text of Particular Size. This text is indecipherable without the use of a reading lens, and is usually incorporated to appear as a single line. This feature is used to print misspelled words to fool counterfeiters who often assume complete and correctly spelled microprint. This feature is difficult to produce with clarity and resolution using a photocopier, scanner, or dye sublimation printer.

Ultraviolet Fluorescence: Offset Printed, Visual/Machine-Readable Art or Text which Produces Light When Activated by an Ultraviolet Light Source. This feature is normally undetectable to the naked eye and can be overlooked by the casual counterfeiter. This feature is difficult to produce with easily obtained equipment. Special fluorescent colors are available for added security.

Light Pipe. This is a substrate based, machine readable feature requiring a light source to detect. This feature is produced using optical techniques which direct light to specific locations of the card (e.g., the edge). The effect is a brilliant light at a location different from where the light source is pointed, and usually in a specific color. Since this feature involves specific translucent materials and optical design of substrates, counterfeiters may never detect this feature. It is also almost impossible to recreate such a feature.

Laser Engraving. This visual substrate-based feature can be either tactile or subsurface depending upon the types of plastics employed. The feature can be either graphic or alphanumeric. Using a laser, a pattern or alpha numeric text is ablated into the sub-layers of a plastic card. Depending on the parameters of the laser system and the materials of card substrate, a tactile or subsurface mark appears. This feature is particularly effective in the serialization of cards to reduce the risk of lost or stolen cards. The mark cannot be "scraped off" without noticeable damage to the card surface. A tactile surface is helpful in quick recognition of authenticity. Laser systems of such complexity are expensive and difficult to obtain.

Metalized Stripe. This stripe is a visual substrate-based feature which can also be machine readable. This feature uses a special metalized stripe (e.g., found commonly inside various currencies) or a holographic stripe (e.g., non-machine readable). These special stripes are placed within the card laminations and are visible to the naked eye. The special stripes can be proprietary in order to limit the availability to counterfeiters. The metalized stripes can be machine readable to verify authenticity. This level of security feature is high because counterfeiters need access to both card manufacturing equipment and the source of materials. These are both difficult to obtain.

Guilloche Pattern. This feature is an intricate pattern of curvilinear fine lines which were originally created by "engine turning," commonly used in currency design. This visual feature is design-based and commonly produced using offset printing onto plastic. It is normally contained under a translucent lamination which acts as protection from abrasion. The fine lines are difficult to reproduce with full clarity and resolution on a copier, dye sublimation card printer, or scanner/personal computer/inkjet system because the dye sublimation printer can print only onto the surface of the card.

Rainbow Guilloche. This feature is similar to the guilloche pattern above and is used in conjunction with a color spectrum which gradually changes from color to color achieving a continuous effect across the surface of the card. The level of security is slightly greater since use of a sophisticated color copier is required to duplicate the pattern effectively.

Cameo Effect. This feature is the result of cropping the background of an image with software to print only a silhouette of the person which makes it more difficult to replace than a square image. This effect is combined and interlaced with other security features, such as hidden infrared on the background of the picture, or interlacing a photo with guilloche patterns on the back.

Ghost Image. This feature provides the ability to print a second photo of a person, which is degraded by software, and it is printed on a faded gray or color scale over the personal data of the person to protect this information from tampering or altering. This effect is also achieved by software.

Types of Holograms. Many different types of holograms with unique visual effects are utilized for commercial and security applications, as well as promotional products. In one embodiment, the present invention includes at least one of the following holograms:

Two Dimensional (2D) Hologram. This hologram lies on one single layer, which projects vivacity of color. With this technique, we convert standard color line artwork or photography into an array of holographic colors.

Three Dimensional (3D) Hologram. This hologram is created from a solid model or sculpture. The product's third dimension is captured. The design becomes a 3D image after the depth of the image is captured through the use of a sculpture. A logo or product will be seen without the need of special glasses or lenses.

Two/Three Dimensional (2D/3D). This hologram combines a superficial layer with other dimensional layers, which can be a combination of both technologies, as mentioned previously. One image produces multi-color levels because of the positioning of the various layers. This system adds a third dimension to pictures.

Line Artwork & Photographs. One embodiment of the present invention uses line artwork, photographs, or a combination of both, to create several layers of images separated by specific distances in order to give the illusion of depth. In general, two layers are enough, but if necessary, five different layers of images can be used.

Colorgrams. Also known as true color holograms, colorgrams usually use someone's photo. It is made up of photographic quality art-work. These holograms are surprisingly capable of displaying true colors of the object, like true human skin tones or the original colors of a flag. If a counterfeiter cannot get the original photo, they cannot duplicate the label. It is a good way to prevent counterfeiting. The colorgram system is similar to the 2D/3D system. Full-color photographs are reproduced in their true, original colors at a specific angle, usually at a 45 degree viewing angle. The system can combine photographs with line artwork at different layer levels.

Stereograms. Stereograms involve the latest in advanced technology. They are the result of a complex system that gathers full images, volume, movement, color and total animation. Total animation gives the sensation of the movement of a live recording.

Holomatrix™ from 50 DPI to 2000 DPI. This feature comprises microtext, optical variable effects, and computer-generated optical devices. Graphic images for this type of hologram are created with microdots. Each dot is an individual embossment made with a laser beam. This feature creates holograms through the use of sophisticated computer technology. The laser beam individually embosses each dot, creating a luminous image with a fascinating presentation of colorful optical effects. This technique prints small dots and is similar to a laser printer or inkjet system. These dots are holographic gratings that act like small prisms that sparkle intensely. With this system, optical patterns can be built of images in such a way that the images can be viewed at a 360 degree angle, and have multiple images in the same hologram. Because of the difficulty of reproducing these images, this feature is excellent for security applications.

Diffractive Optical Variable Image Devices. All the products classified as DOVIDs (Diffractive Optical Variable Image Devices) present an image which changes colors when tilted in various angles. This essential characteristic makes the images impossible to copy or imitate by traditional printing and graphics software.

Optical Variable Devices. An optical variable device (OVD) is a way of printing an image in such a way that certain characteristics vary when viewed or illuminated from different angles.

Combined Holograms. These holograms combine two or more of the above mentioned types of holograms. Combining Holomatrix™ with any of the above types makes the hologram more complex and ideal for security applications.

Optional Tests. In one embodiment of the present invention, the identification mechanism is tested in multiple ways. Laboratory tests are used to demonstrate durability, tamper proof, temperature and humidity stability, abrasion resistance, adhesiveness and light stability to ensure durability of the identification mechanism and to ensure that the dyes will not fade or degrade before at least 5 years of extensive use. In addition, dual lamination can be performed.

One embodiment of the present invention can include at least one of the following tests.

Static Bending Test. In this test, a composite card is tested to exceed 100,000 bending cycles without breaking or losing its integrity.

Heat Test. In this test, a composite card is exposed for an extended period of time to intense sunlight, boiling water, and a temperature of up to 220 degrees Fahrenheit without twisting or bending.

Rigidity Test. In this test, multiple layers are applied to a composite card to give it rigidity so that when it is laminated it will not lose its flat shape, guaranteeing that the bar code is readable.

Durability Test. In this test, a card is placed in a steam pressure chamber at 160 degrees Fahrenheit for four days to test that the card will not warp or break, and that the over lamination will not come off.

Abrasion Test. In this test, a card is placed in an agitator containing a water and sand solution and subjected to 30 minutes of agitation.

Required Security Levels. Multiple security levels exist and are explained below.

First Level Security Features. First-level security features are clearly visible so that any attempts to modify the text data, photo image, or other personalized information is evident at a simple glance.

In one embodiment, the first-level security features include a complex hologram with multiple security features, combining a complex hologram structure with micro printing. The printer and the hologram are transferred through a holographic registration and a fiber optic sensor to assure very high accuracy. The holographic pattern is always transferred in the same position.

In one embodiment of the present invention, the hologram includes at least one of the following general features:

A highly integrated technology and expensive machinery is required for mass production. Only manufacturers with sophisticated know-how can maintain its quality.

The hologram makes the object visibly distinguished from other printing materials or those color copied.

Some types of hologram (e.g., Kaleidogram, Finegram) ensure more satisfying security features than of the flat types, since the most advanced equipment is necessary in the process of production.

In one embodiment of the present invention, reproduction features include:

A Transparent Kaleidogram with protective OP layer that is heat transferred on to the card book. It covers the entire printed area.

Attempts to remove the hologram layer will damage the composition of the hologram. Thus it cannot be reused, or tampered.

Combined with micro-letter printing, the reproduction by color copy or photomechanical process is not feasible, as the 0.26 mm size characters is ruined when reproduced. Additional first-level security features can be integrated with the RF identification mechanism (e.g., card) in the future. An example of such security features would be icons, symbols, or guilloches that could be printed in special solvent sensitive inks. These features can be printed directly onto the intermediate transfer layer. These security features could be employed at some time in the future if a solvent tampering technique is identified.

Overall, the proposed first-level security features provide the document with excellent protection against altering and falsification, as well as acts of counterfeiting. The features are readily visible and any attempts to modify the underlying information is evident at a glance.

Second Level Security Features. Second-level security features can also be included. These second-level security features are invisible to the eye under normal viewing conditions, and are evident only when using a proper detection device. In one embodiment of the present invention, at least one of the following features is included:

Invisible Ultraviolet-Fluorescent Features. The visible portion of the energy spectrum extends from deep blue at, for example, 400 nm to deep red at, for example, 700 nm. Long wavelength ultraviolet energy in the region of the spectrum for example, between 350 nm and 400 run, such as 380 nm, is used to excite an embedded ultraviolet-fluorescent material. These high-energy ultraviolet photons are absorbed by the fluorescent material that happens to be invisible or transparent in the 400 rim. to 700 nm region of the spectrum. The ultraviolet photons pump the absorbing material to excited energy states. The material in the excited states quickly relaxes back and releases the absorbed energy again in the form of photons. Because some of the energy is lost in this transition, the emitted photons have less energy than the absorbed photons. The visible portion of the energy spectrum is positioned at the lower energy photon levels. Consequently, the process results in visible light being emitted from the material when it is illuminated by ultraviolet light. In a darkened room, the eye detects the glow being emitted by the ultraviolet-fluorescent material but not the ultraviolet light that is used to excite the material.

Two-Dimensional Bar Code. The card solution can include a PDF-417 format barcode (two-dimensional barcode) that is printed onto the card. The PDF-417 barcode can hold several types of data (e.g., fingerprint minutiae, personal information).

RF Device. An RF device can complement all the previously mentioned security features, as it has a unique identifier (e.g., a unique 64 bit serial number), and the information contained on it is protected by sundry cryptographic methods. The capacity of the device will allow a great deal of information about the holder to be stored on the device (e.g., fingerprint minutiae or other biometric template, the holder's biographical information, statistical information).

Those experienced in the art will see that an RF device allows data to be written to and read from the device via an antenna without the holder having to present the document for verification through traditional methods such as visual inspection, or other method of machine reading.

Third Level Security Features. Two optional security features can be changed every eighteen months: special IR-activated security taggant material and proprietary security taggant material.

Special Infrared-Activated Security Taggant Material. A special ceramic compound (e.g., such as a product named Taggant, provided by Secure Products) is mixed with a clear ink media in very small concentrations. (The ceramic compound is referred to as Taggant, but those experienced in the art will recognize that other ceramic compounds or equivalent product can be used.) This mixture is printed on the intermediate transfer material surface. After being ground to small particles that are approximately 2-3 pm in diameter, the special ceramic compound appears to be a very fine white-colored powder. The combination of the white color, the small particle sizes and the low concentration causes the material to be invisible to the eye.

A low-power, eye-safe near-infrared laser can be used to activate the special IR-activated taggant material. The input wavelength of the laser must be tuned within a 3-5 nm bandwidth in order to activate the material. The input energy is pumped into the material with the lower energy photons of the laser. The combination of the long lifetimes for the excited energy states and the high concentration of photons from the near infrared laser result in a second transition upward in energy level. In other words, two photons are absorbed by the material to increase the available excitation energy. These high excitation energy states relax releasing photons in the visible portion of the spectrum as well as the near-infrared portion.

This process of effectively adding two lower energy photons together to release a higher energy photon is called "up-conversion." The special IR-activated security taggant material has three separate emissions or security features. When an appropriate infrared laser, which is invisible to the eye, is focused on the special taggant material, three features are emitted simultaneously. These three features are a visible green spot at the point of focus, a visible blue spot at the point of focus, and an invisible infrared point at a higher energy level in the near-infrared portion of the spectrum. When viewed by the eye, the green and blue spots blend together to create a vivid turquoise color. However, all three features can be detected automatically and separately with the proper equipment.

Proprietary Security Taggant Material. A proprietary security taggant material can also be included in the card design. A special ceramic taggant material (e.g., such as the one produced by Secure Products) exhibits multiple security features and is in part based on the "upconversion" concept. The white powder is ground into particles that are 2-3 nm in diameter and is mixed into a clear ink media in very small concentrations. Again, as before, the combination of the white color, the small particle sizes and the low concentration causes the material to be invisible to the eye. However, this special material can be activated by several wavelengths and each activation wavelength results in a different response.

One characteristic and security feature is activated by a special low-power, eye-safe near-infrared laser. The activation bandwidth is approximately 3 nm and is located on the longer wavelength side of the activation energy required for the second-level feature. Laser devices are far less common in this area of the spectrum. When the special taggant is excited by a laser specially tuned to this excitation frequency and bandwidth, two separate emissions are observed. One emission is in the visible portion of the spectrum and can be observed as a green spot at the point of incidence. The second emission is in the near-infrared portion of the spectrum near the excitation wavelength of the first optional security feature.

A second characteristic and security feature is observed by using a second low power, eye-safe near-infrared laser at about the same excitation energy as the similar second-level feature. At this excitation wavelength, a green spot can be observed at the point of incidence due to the "up-conversion" process.

Finally, a third characteristic and security feature can be observed by applying energy in a wider bandwidth in the upper portions of the visible energy spectrum. This wavelength of energy is absorbed and re-emitted as longer wavelength infrared energy. In one embodiment, the initial implementation activities will focus on a verification process that utilizes a single excitation wavelength and a single observation wavelength. The implementation of the other embedded security characteristics can be phased into the program as new features are required to maintain the overall security of the card documents. Since these untapped security features and benefits will have existed in the documents from the initial issuance, the implementation of the new features will minimize the impact to the overall system.

In addition, new security features can be integrated into the present invention should the need arise.

D. Method of Using the General RF Identification System

Figure 4:
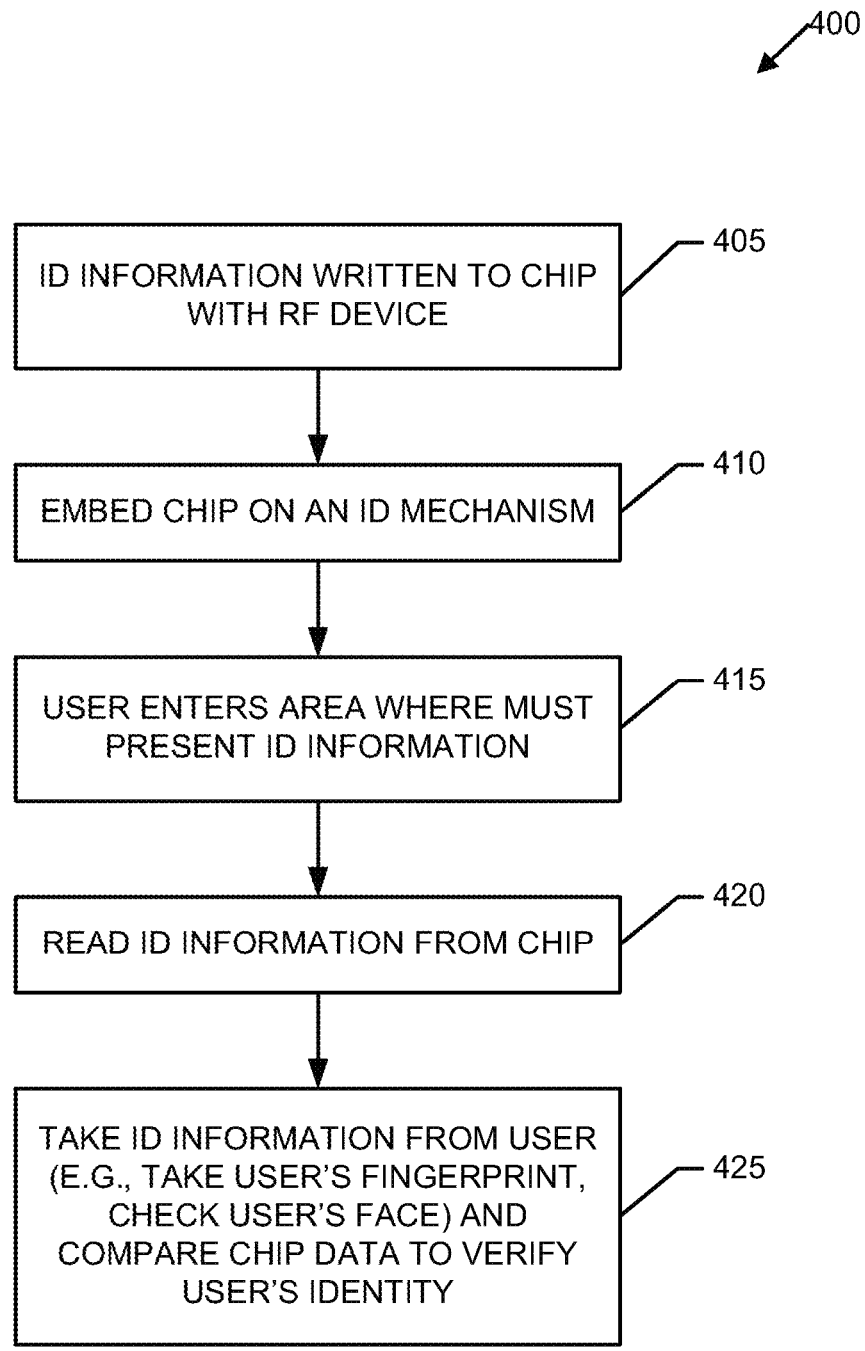

FIG. 4 illustrates the methods of using the RF identification system 400, according to one embodiment of the present invention.

In 405, the identification information (e.g., fingerprint, picture) is written to a chip with an RF device. In 410, the chip is then embedded on an identification mechanism (e.g., license plate, passport, card). In 415, a user enters an area where identification information must be presented. In 420, an RF reader/writer reads the identification information from the chip. In 425, the user allows identification information to be taken (e.g., a fingerprint scan, an authority checks a user's face) and this information is compared to the chip data to verify the user's identity.

II. RF Registered Item and Method of Use

One embodiment of the present invention allows authorities to track information regarding a registered item (e.g., a vehicle), identify the item, and determine whether a driver of the item has the right to operate the vehicle. The present invention is described using the illustration of a license plate, but those experienced in the art will recognize that multiple other embodiments are possible, including, but not limited to: a sticker (e.g., a self-adhesive decal that can be placed on an automobile window, windshield or license plate), an RF embedded license plate (e.g., if the license plate is to be manufactured with some non-conductive material, the RF device can be embedded directly into the license plate), an encapsulated RF device (e.g., in the housing of a rear-view mirror, headlights or taillights, the vehicle's front or rear bumpers, or in any non conductive component of the vehicle; the device can be encapsulated in such a way that it will resist normal use and exposure to the elements, or embedded directly into the materials comprising the aforementioned placement media).

The present invention can be used, for example, for vehicle identification, border crossing solutions, traffic violations, insurance programs, pollution control, vehicle access control, traffic logistics planning and engineering, toll booths, and other vehicle control applications. The present invention takes centrally stored information and makes it accessible to the field (e.g., to police or other authorities). It also extends and expands the verification of individual and item (e.g., vehicle) information.

A. RF Registered Item

FIG. 5 illustrates an RF registered item 500, according to one embodiment of the present invention. The registered item 500 includes the following components: A modulator 515 is a device that receives baseband signals from an antenna. An AC/DC converter 520 is a device that receives an alternating current (AC) and converts it to direct current (DC). An encoder 525 is a device for encoding information received so that it may be utilized by another device or protocol. A decoder 545 is a device that decodes information from the encoder output so it may be used by another device or display. A power control 550 is a device which regulates voltage and current to protect an apparatus from both power surges and low power. An instruction sequencer 530 is a device that queues instructions to be sent to the chip's internal memory. A security management unit 555 is a device that checks and validates the cryptographic keys that will be sent to the cryptographic block. A cryptographic block 510 is a device that stores the security keys. These keys are checked and validated to grant or deny access to the memory chip. EEPROM memory 505 stores data. Information can be read and written from or to this device.

B. Method of Using RF Registered Item

Figure 6:
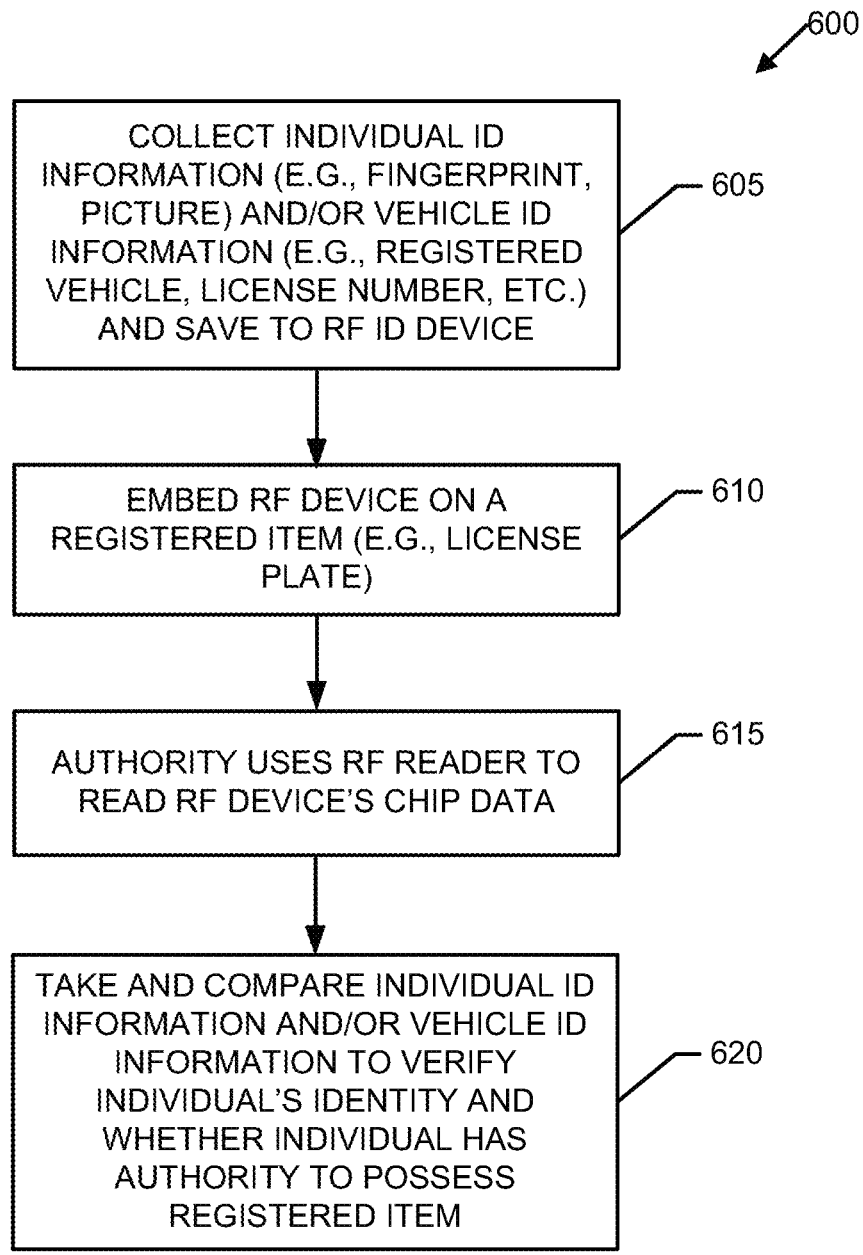

FIG. 6 illustrates the method of using RF registered item 600, according to one embodiment of the present invention. In 605, individual identification information (e.g., fingerprint, picture) and/or vehicle identification information (e.g., registered vehicle, license number) are collected and written to an RF device (i.e., a chip with an RF antenna). In 610, the RF device is embedded onto an identification mechanism, a license plate. In 615, an authority wishing to check a vehicle uses an RF reader/writer to read the chip data. In 620, the authority takes and compares the individual identification information (e.g., user's fingerprint, check user's face) and/or vehicle identification information (e.g., check make and model of vehicle, check vehicle license number) and to the chip data to verify an individual's identity and whether the individual has the authority to possess and operate the vehicle.

Figure 7:
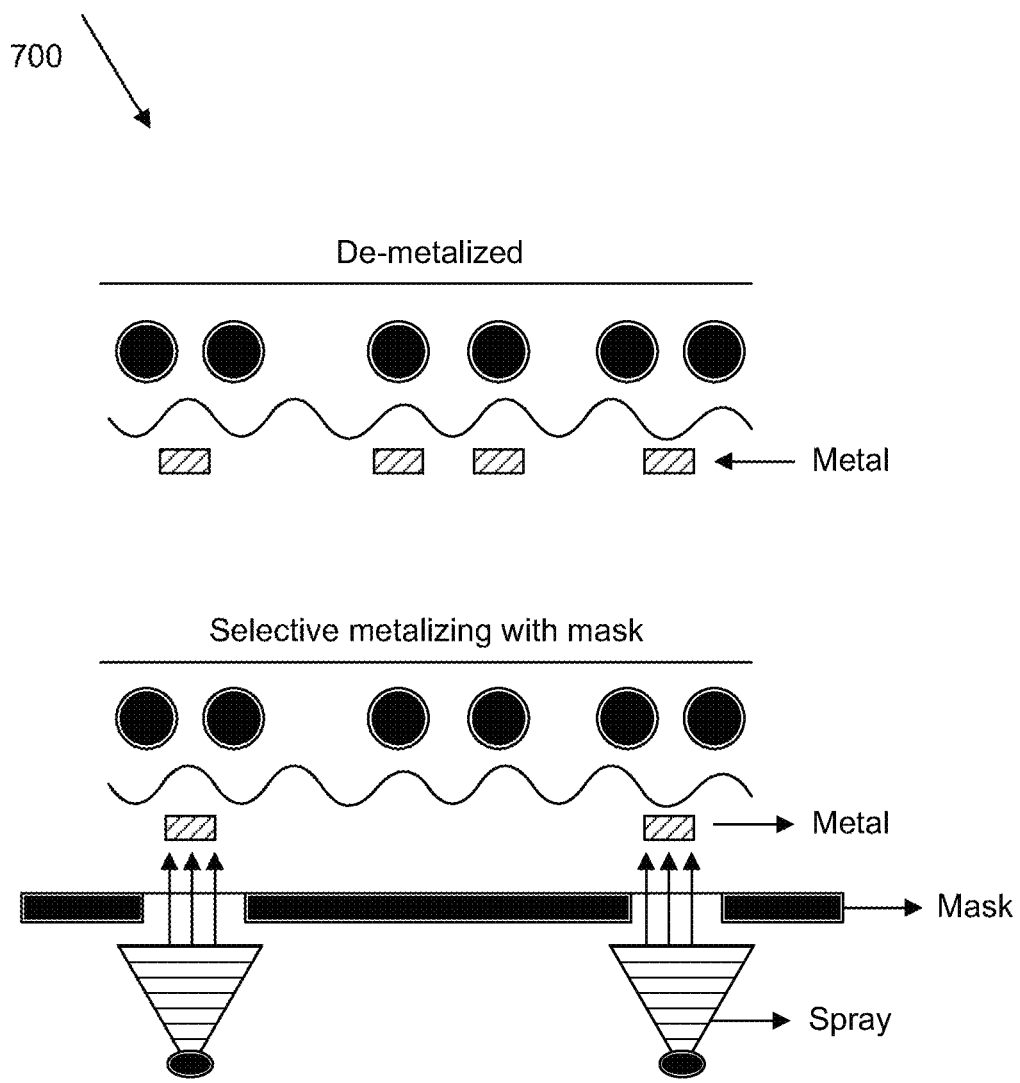

In one embodiment, a selective metalizing procedure is used to selectively metalize the areas which will not carry the RF device. This can be done by using a mask, as illustrated in FIG. 7.

C. Method of Making RF Registered Item

In one embodiment, the identification mechanism (e.g., license plate) comprises a material that allows visual validation of the registration, even at night. The material can be a retro-reflective material, holographic foil, or another substrate with a high metal content.

Figure 8:
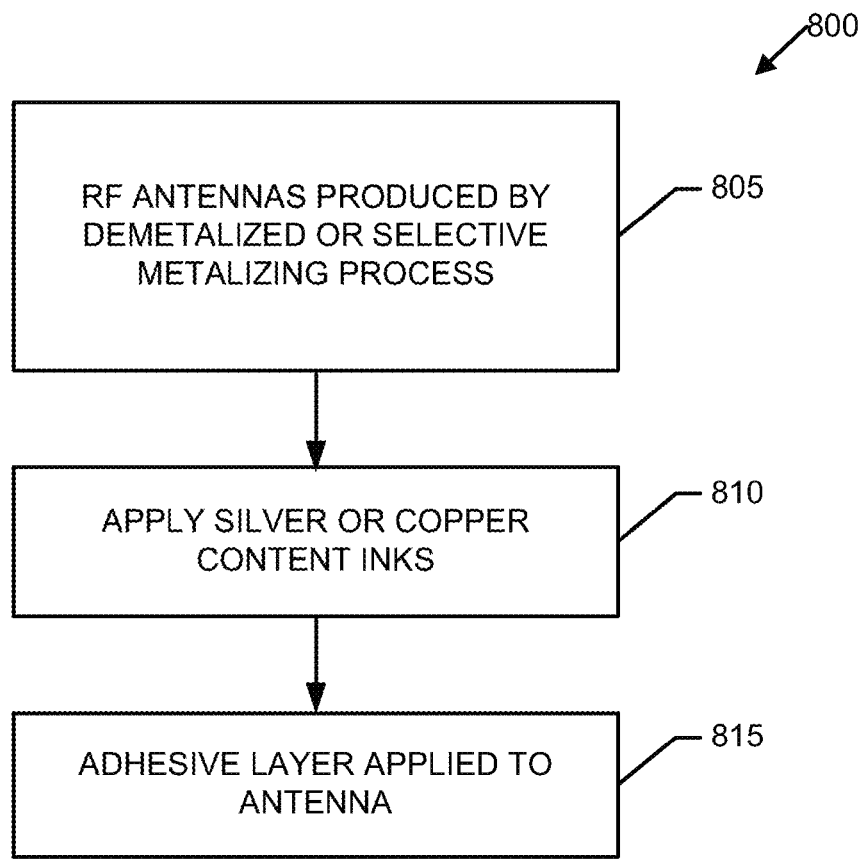

FIG. 8 illustrates method of making RF registered item 800, according to one embodiment of the present invention. In 805, antennas are produced on a demetalized or selective metalizing process. In 810, after demetalizing, resistance is decreased and conductivity is increased by applying inks containing silver or copper (e.g., conductive inks). In 815, an adhesive layer is applied to the antenna in a Web environment or with automatic label capabilities.

In one embodiment of the present invention, at least one of the following is tracked:

Vehicle Identification Number (VIN). The VIN is the vehicle's international registration number and is the "fingerprint" of the car. Vehicle identification is performed by visually reading the car's VIN, and using the software to validate the VIN. This software allows a user to determine if the vehicle has been modified, altered, and/or stolen.

Owner Identification. Owner identification is made using photographic information (e.g., a photograph) and/or biometric information (e.g., a fingerprint, iris pattern) stored in the RF device.

Tracking Information. The RF device is used to read the VIN number and the owner's information. This can be used to identify a vehicle or individual reliably without having to connect to a central database.

Central Data Base. The central data base validates the identity information for increased security (e.g., tracking who and where the device was produced and who it belongs to).

D. Optional Security Features

In one embodiment of the present invention, at least one of the following security features is included:

Secure Device. In one embodiment, the device has: numerous (e.g., five) visual inspection security features visible only to the naked eye; numerous (e.g., three) non-visual forensic security features that require a special device for detection; and at least one security feature requiring a special detection device that is proprietary (i.e., it was manufactured specifically for a particular client).

Secure Identification. This feature requires information contained in the device to be unalterable without a determination of who wishes to alter the information and for what purpose. Highly secure chips with a hardware programmable cryptographic block with credit and debit exchange keys is used in one embodiment of the present invention. In addition, the individual information of the vehicle (e.g., the VIN) and the personal information (e.g., biometrics) contained in the device must be protected.

Secure Transaction. This feature protects the device from the equipment that reads and writes from the device. This equipment must be initialized using the same encryption keys as the RF device.

Secure Data Base. This feature protects information in the central data base and the transaction log indicating where and for whom the device was produced. Central data base security is possible using encryption. This technology allows centrally-stored information to be taken to the field (e.g., to track the inspections for stolen vehicles). It also extends and expands the verification of both individual and vehicle identity.

III. RF Identification Mechanism and Method of Use

The present invention includes an RF identification mechanism, such as a passport, and a method of using the same. The present invention will be described in the context of a passport. However, those experienced in the art will recognize that the RF identification mechanism is not limited to a passport, and multiple other embodiments are available, including, but not limited to: a license, credit card, cell phone, etc.

A. RF Identification Mechanism

Figure 9:
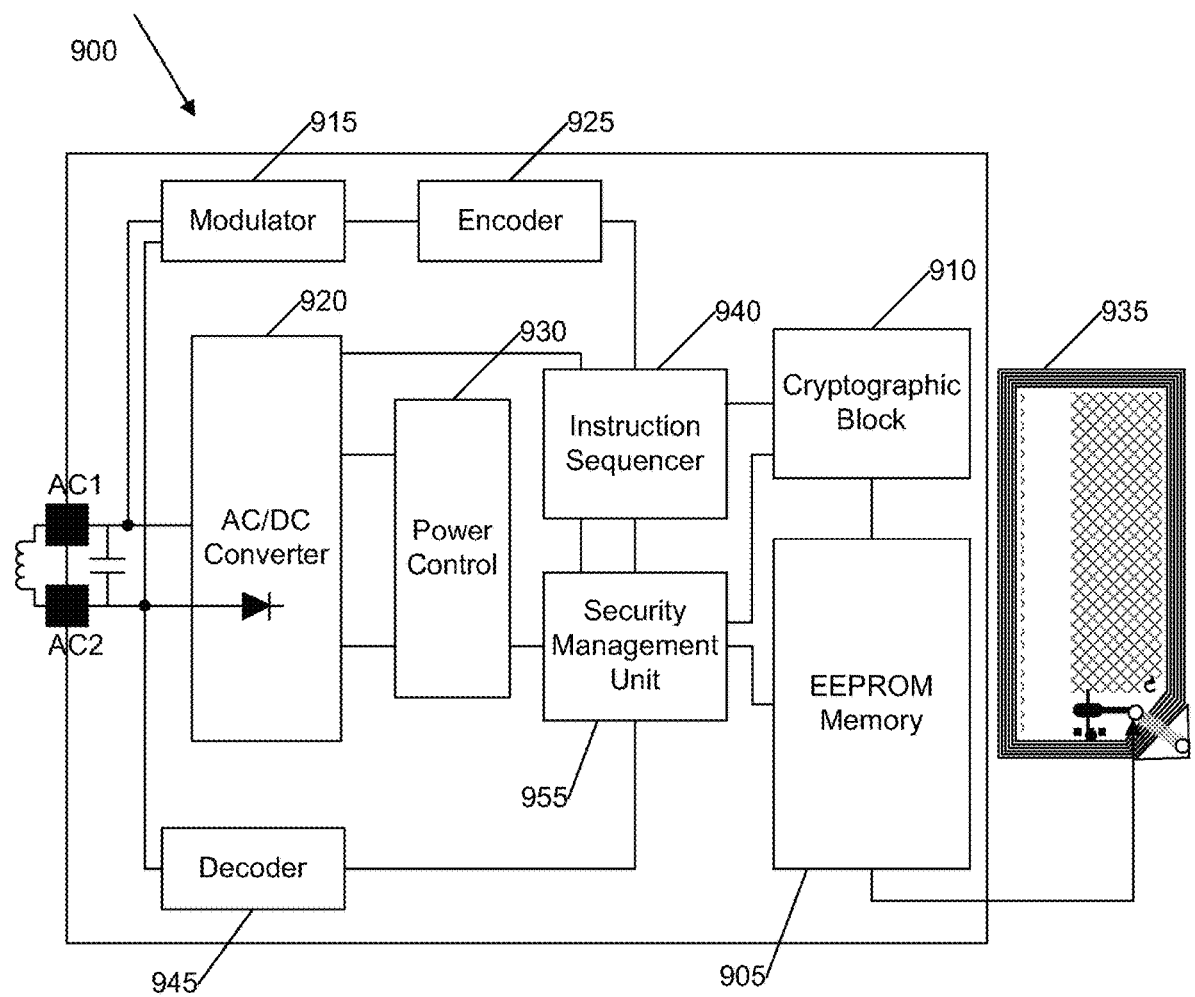
FIGS. 9-11 illustrate the RF passport and method of use, in an embodiment of the present invention.

FIG. 9 illustrates an RF registered item 900, according to one embodiment of the present invention. The registered item 900 includes the following components, as described earlier: a modulator 915, an AC/DC converter 920, an encoder 925, a power control 930, an instruction sequencer 940, a cryptographic block 910, a decoder 945, a security management unit 955, a memory 905, and an antenna 935.

B. Method of Using an RF Identification Mechanism

Figure 10:
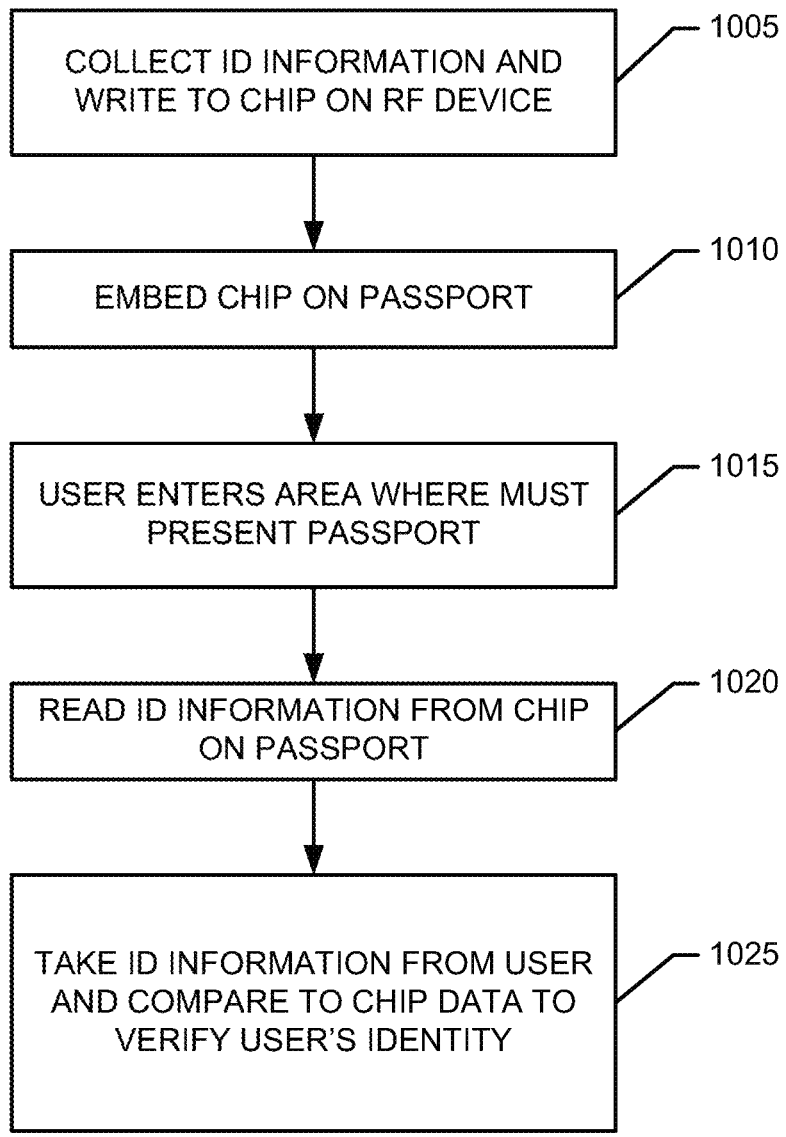

FIG. 10 illustrates a method of using the RF passport, according to one embodiment of the present invention.

In 1005, identification information (e.g., a biometric template, photography, social security number, personal identification number) is collected and written to the chip on the RF device. In 1010, the RF device is embedded on a passport. In 1015, the user enters an area where a passport must be presented and an RF reader/writer reads the identification information from the RF device on the passport. In 1020, an authority collects second identification information from the user (e.g., takes the user's fingerprint, looks at the user's face) and the information is compared to the RF device data to verify the user's identity.

C. Method of Making an RF Identification Mechanism

Figure 11:
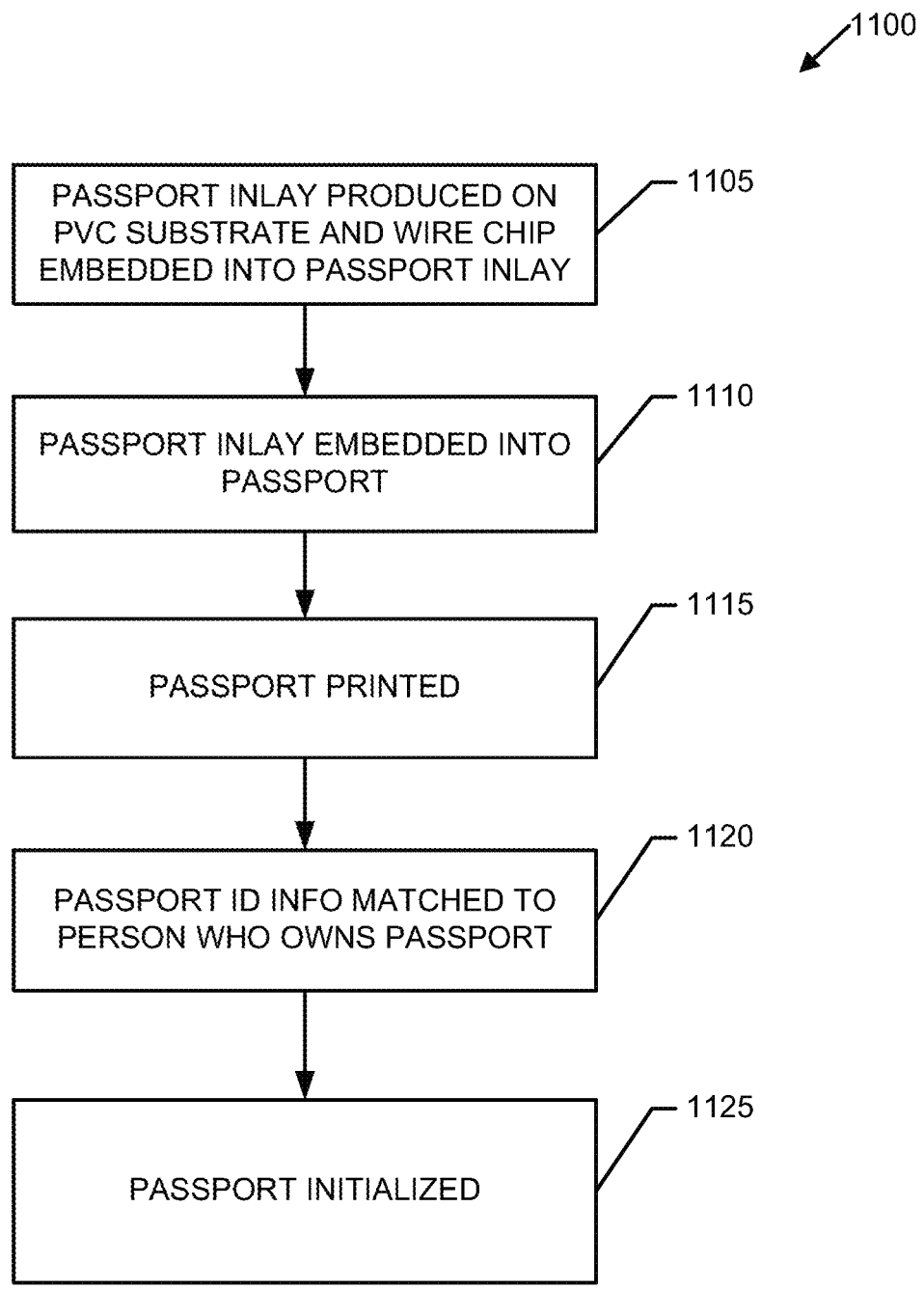

FIG. 11 illustrates how an RF passport is made, according to one embodiment of the present invention. In 1105, the passport inlay is produced on a PVC substrate. A copper wire and chip are embedded into the passport inlay. In 1110, the passport inlay is embedded into the passport document. In 1115, the passport is printed using a holographic retransfer film and dye sublimation inverse printing. In 1120, the RF passport identification information is matched to the person who owns the passport. In 1125, the passport is initialized, and personal information and/or biometrics are encoded on the passport to the RF device. This is done after the passport is personalized for security reasons. The RF passports are of no utility if they are stolen, as they need to be initialized with proper encryption keys and personalized.

IV. RF Communication Device and Method of Use

One embodiment of the RF communication device creates a communication through a network to a point of sale ("POS"). This is performed, for example, by a wireless RF device that stores a person's identification information, and can thus become a person's identification "document." This is discussed in the context of an RF cellular telephone, but those experienced in the art will recognize that any communication device, including but not limited to a personal digital assistant or a pager, can be used.

As a user with an RF cellular telephone approaches a POS with an RF reader/writer, the RF reader/writer identifies the user and obtains any relevant information stored on the RF cellular telephone. The user is then asked to enter authentication information (e.g., a fingerprint). If the user wishes to complete a transaction, the user enters the authentication information. An exchange of information via the RF reader/writer and the RF cellular telephone results in verification that the authentication information matches the RF cellular telephone information.

The present invention, referred to in one embodiment as an RF cellular telephone, creates a communication through a network of cells to a point of sale (POS). This is performed by combining Global System for Mobile Communication (GSM) technology with a wireless RF device that can store a person's identification information, including an electronic or biometric "signature" (e.g., fingerprint, facial, iris, or other recognition feature). GSM technology includes a compact chip located on the back of the telephone. The compact chip has an operating system. The GSM telephones identify the telephones to a network carrier to avoid, for example, telephone cloning.

The RF cellular telephone can thus become a person's identification document (e.g., passport, boarding pass) and/or credit card or other card (e.g., mileage cards). Multiple types of information can be carried and stored on the RF cellular telephone. The following uses are examples of how the RF cellular telephone can be used: an RF cellular telephone can be used as a substitute for credit cards, transforming the cellular telephone into the media of commercial transactions and transform telephony into the identification media for commercial establishments or authorities; an RF cellular telephone can be a personal identification or a Portable Data File (PDF); an RF cellular telephone can be integrated with a Global Positioning System (GPS) receiver; an RF cellular telephone can be integrated with hand held devices to provide Internet access, and access to business and personal information (e.g., email); and an RF cellular telephone could be a boarding pass (e.g., e-ticket) and/or could track a user going through security with authentication by fingerprint at a gate or other local area. Those experienced in the art will recognize that there are multiple other examples and uses of the RF cellular telephone.

One embodiment of the present invention provides at least one of the following benefits: assists in avoiding current credit card fraud, through clonation, substitution of identity, or counterfeit documents; reduces or eliminates the need to carry credit cards, documents (e.g., a boarding pass) or other information; reduces or eliminates the need for an entity to issue or update credit cards or identification documents (e.g., tickets), with associated fees (e.g., mailing costs); and reduces or eliminates the need to stand in line or wait for services.

The present invention is discussed in the context of using a fingerprint for identification, as this is a widely recognized identification tool. However, those skilled in the art will recognize that any type of identification information (e.g., Personal Identification Number (PIN)) or any other biometric identifier (e.g., a voice print, iris recognition, facial recognition) could be used.

A. RF Communications Device System

Figure 12:
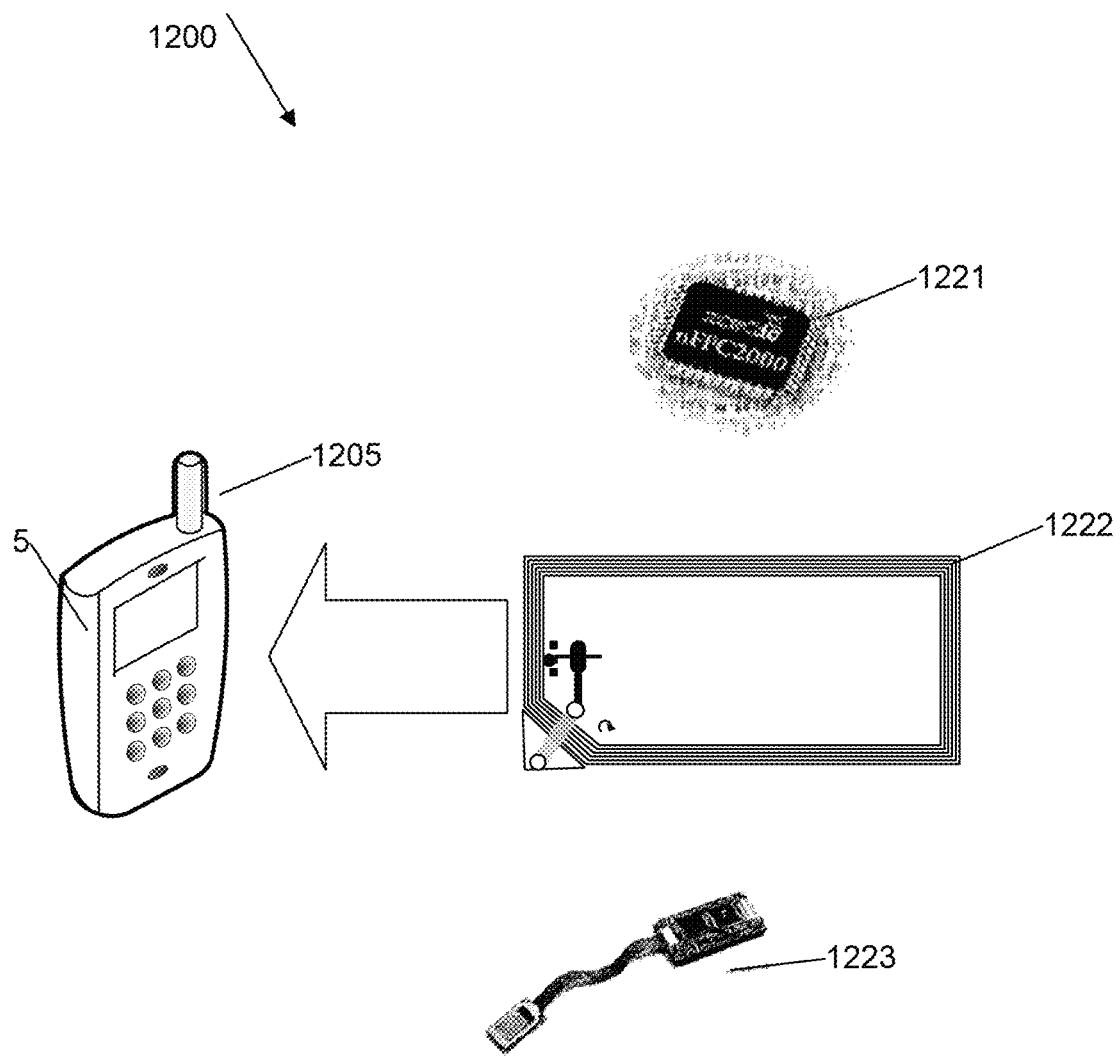
FIGS. 12-14 illustrate the RF communications device and method of use, in an embodiment of the present invention.

FIG. 12 illustrates an RF communications device system, according to one embodiment of the present invention. The system includes an RF cellular telephone 1205 and a point of contact (POC) or point of sale (POS) 1210.

The POS 1210 can include an RF reader/writer 31 and a fingerprint digital scanning device 1232. One-to-one verification ensures that the information on the RF cellular telephone matches the holder of the RF cellular telephone.

The RF cellular telephone 1205 can include the following: a fingerprint identifier 1221 (e.g., an Application Specific Integrated Circuit (ASIC) chip, which is a chip that is designed specifically to run fingerprint matching software on an operating system); and an RF device 1222 (with an antenna in the chip) to store identification information. In an alternative embodiment, the RF cellular telephone can include a fingerprint digital scanner 1223. As mentioned earlier, this could either be included on the RF cellular telephone, or on a fingerprint digital scanning device at the point of contact.

Figure 13:
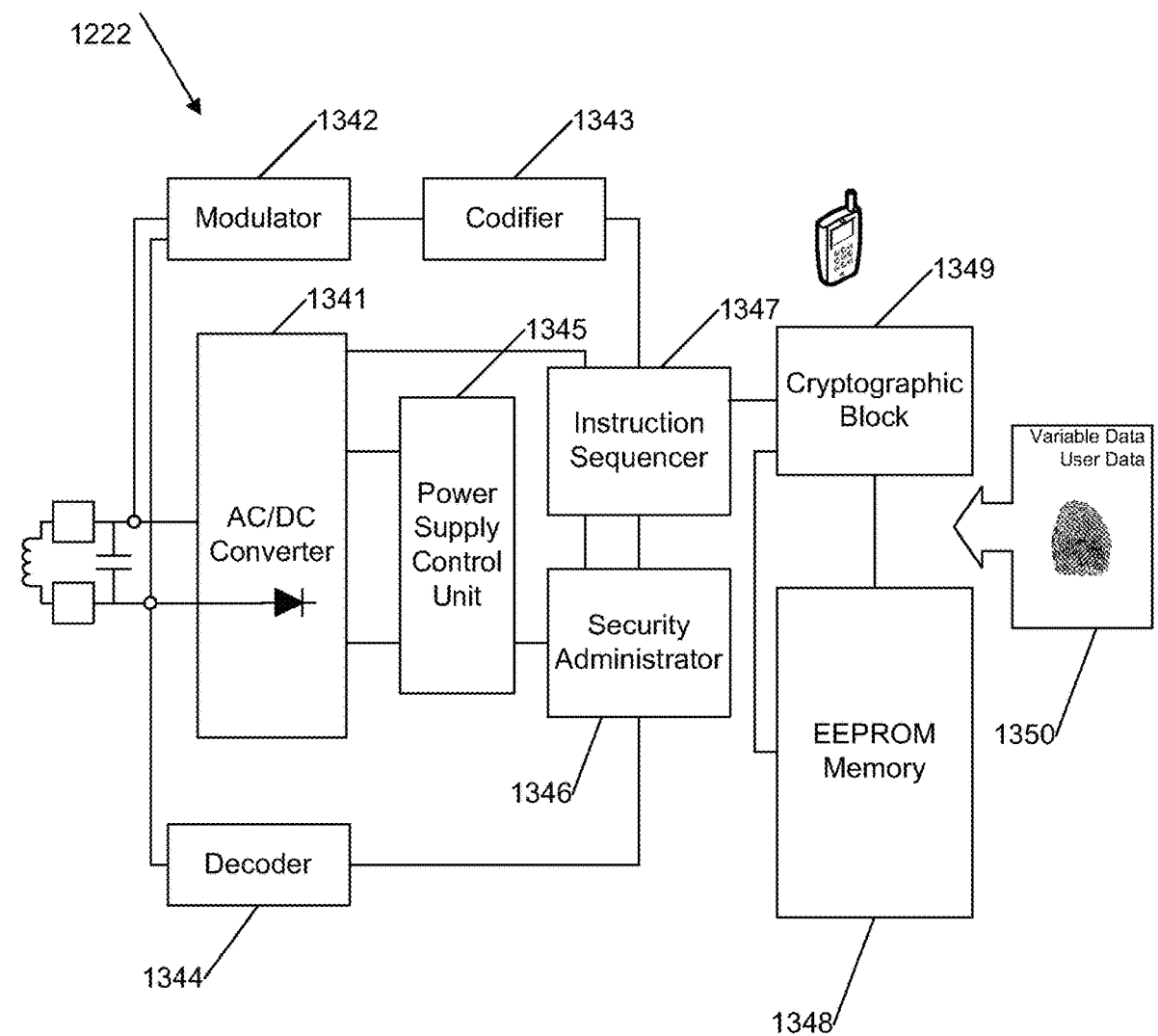

One embodiment of the RF device 1222 includes a chip and an RF antenna, as described herein. One embodiment of the chip is illustrated in FIG. 13. The chip is a passive chip that is secure. These chips have a power unit converter and are secure. The EEPROM 1348, the memory of the chip, is totally separated from the rest of the communication, so if the security requirements are not met, a user cannot access the memory of the chip. The chip includes an ACDC converter 1341 and a connection to an RF antenna for power using a power supply control unit 1345. The chip communicates with information stored on the telephone by coupling to an input device in the cellular telephone. A modulator 1342 is a device that receives baseband signals from an antenna. An AC/DC converter 1341 is a device that receives an alternating current (AC) and converts it to direct current (DC). An encoder 1343 is a device for encoding information received so that it may be utilized by another device or protocol. A decoder 1344 is a device that decodes information from the encoder output so it may be used by another device or display. A power control 1345 is a device which regulates voltage and current to protect an apparatus from both power surges and low power. An instruction sequencer 1347 is a device that queues instructions to be sent to the chip's internal memory. A security management unit 1346 is a device that checks and validates the cryptographic keys that will be sent to the cryptographic block. A cryptographic block 1349 is a device that stores the security keys. These keys are checked and validated to grant or deny access to the memory chip. EEPROM memory 1348 stores data. Information can be read and written from or to this device.

In an embodiment of the present invention, the chip carries authentication information (e.g., fingerprint) and transaction information (e.g., credit card information, airline, or hotel mileage card information). The RF cellular telephone also may include a cryptographic programmable block chip 1349 to enhance security.

B. Method of Using an RF Communications System

Figure 14:
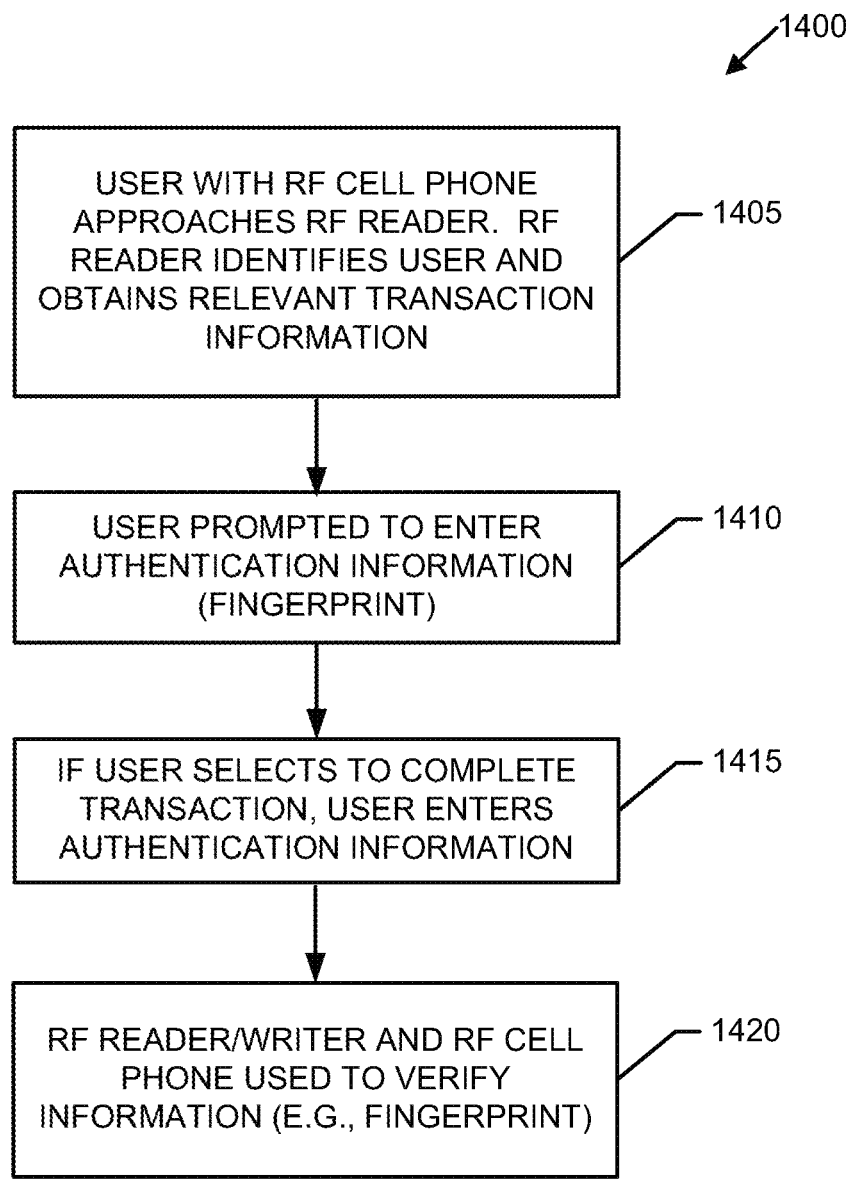

FIG. 14 illustrates method of using an RF communications system 1400, according to one embodiment of the present invention. The present invention connects to a local POS, rather than a cellular carrier. Instead of a POS device obtaining credit card information via, for example, a magnetic stripe, the present invention, via an RF embedded on a cellular telephone, provides information to the POS, which has an RF reader/writer. In addition, the POS may include a device (e.g., a fingerprint reader) to verify that the holder of the RF cellular telephone is the owner of the RF cellular telephone. The fingerprint, or other identification feature, can be stored, for example, in the Chip, or at a remote location, for example, which is accessed by the POS device. Thus, for example, the store could run a one-to-one local verification of a user's identification by having the user imprint their fingerprint into a fingerprint reading device. The identification information, such as a fingerprint, is a string of information. That information is stored on the Chip. When the user puts a fingerprint on the POS fingerprint reader, the present invention will determine if the fingerprint matches the information stored on the RF cellular telephone. In an alternate embodiment, the user could imprint their fingerprint into a fingerprint reading device included on the RF cellular telephone.

According to FIG. 14, in 1405, a user carries an RF cellular telephone and approaches an RF reader/writer (e.g., in a hotel), which is continuously scanning. The RF reader/writer connects to the network (e.g., the Internet), identifies the user, and obtains relevant transaction information (e.g., credit card information and hotel rewards card information).

In 1410, the customer purchases a service or product and is prompted to enter authentication information (e.g., a fingerprint). In 1415, if the user wishes to complete the transaction, the user enters authentication information (e.g., imprints a fingerprint into a fingerprint scanner) and it is loaded to the RF device.

In 1420, the RF reader/writer and RF cellular telephone are used to verify the authentication information (e.g., the fingerprint scanner works with the RF reader/writer and the RF cellular telephone and/or other devices to ensure the customer's fingerprint matches the fingerprint stored on the RF cellular telephone) and this information is presented to a point of sale or access control device to retrieve purchase information.

Although the present invention has been described in the context of a POS, those skilled in the art will recognize that a user could use the RF cellular telephone without a POS. For example, a user could call a telephone number to buy a ticket to access a stadium, using identity verification and other transmitted information. As another example, a user could load a boarding pass or ticket to an event on an RF cellular telephone, and the boarding pass or ticket would be confirmed at an access control device around the perimeter of an airport lounge or stadium.

Additional information related to the present invention can be found in U.S. patent application Ser. No. 10/118,092, filed Apr. 2, 2002, and PCT Patent Application 160201439, filed Apr. 30, 2002, which are herein incorporated by reference.

V. System and Method for Border Crossing Control

One embodiment of the present invention provides a border crossing control mechanism using RF technology. This technology helps provide a flexible, efficient, and effective border crossing security system to meet the needs of rapidly changing security conditions. The present invention provides heightened security while at the same time efficiently and quickly moving vehicles and people across borders and through customs. In this embodiment, an identification mechanism (e.g., a laser card) is integrated with a vehicle decal that registers and matches any shipping components (e.g., drivers, vehicles, containers). The shipping components will be pre-registered in the decal at a point of origin. A fingerprint biometric of the driver is written into the identification card and the decal at the factory. An RF antenna embedded into the decals allows tracking of, for example, the driver, cab and trailer, and validation of these components at strategic checkpoints. It also provides for designated routing through the port for inspection and clearance prior to departing the port.

The present invention can be used in a closed system or open system. In a closed system, all information resides on the RF laser card and RF decals. In an open system, information is passed from the point of original to country A's custom's inspectors, and from country A's customs inspectors to Country B's customs inspectors using a network (e.g., the Internet). This makes integration and implementation easier.

A. Border Crossing Control System

Figure 15:
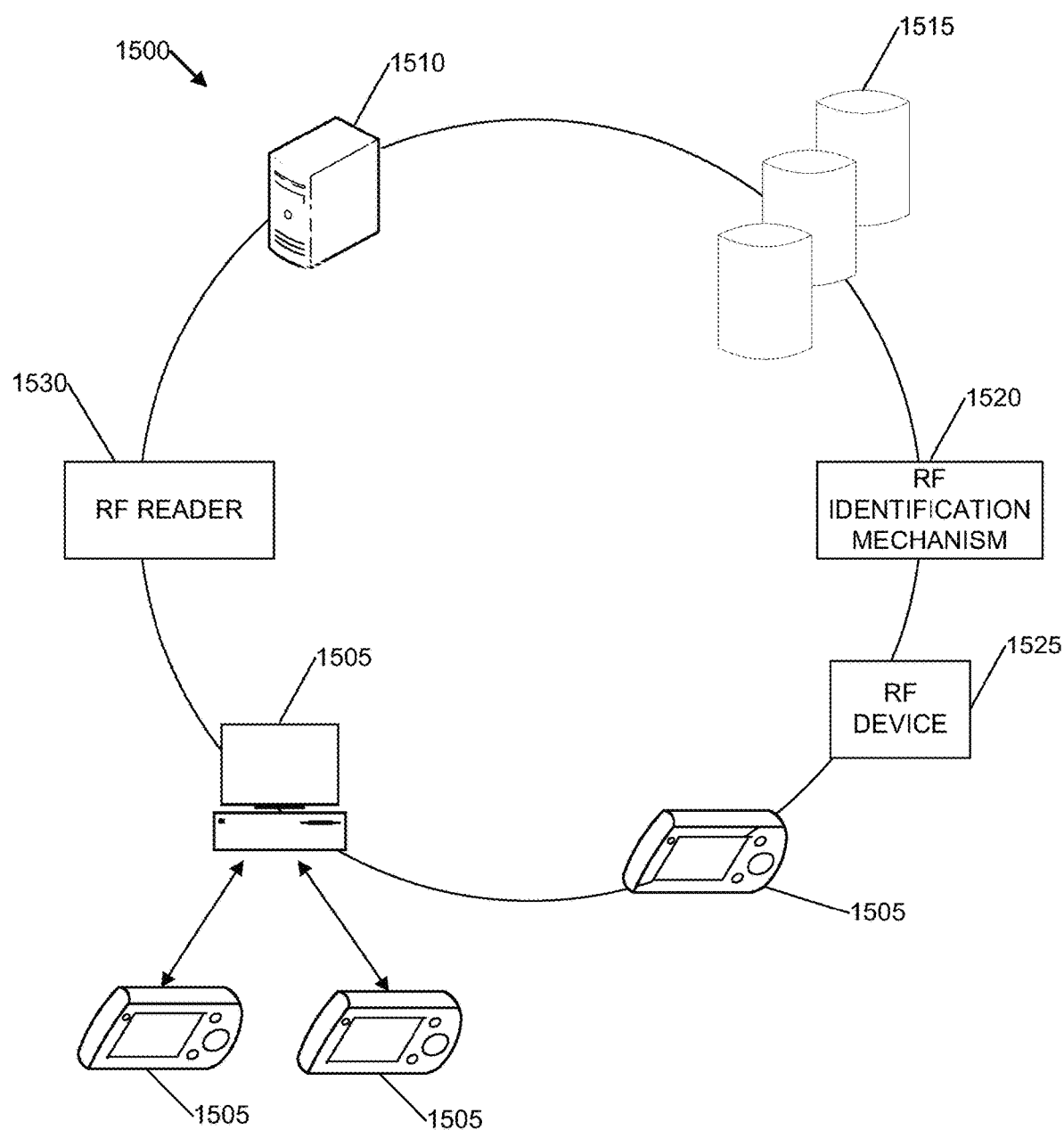
FIGS. 15-18 illustrate a system and method for border crossing control, in an embodiment of the present invention.

FIG. 15 illustrates border crossing control system 1500, according to one embodiment of the present invention.

The system 1500 includes at least one client 1505, application server 1510, database 1515, RF identification mechanism 1520, RF device 1525, RF reader/writer 1530, connected by a network 1520.

Client. According to one embodiment of the present invention, clients are any computers (e.g., PC, PDA, cellular phone) connected to a network (e.g., LAN [Local Area Network], WAN [Wide Area Network], VPN tunnel [Virtual Private Network Tunnel], Internet).

Application Server. According to one embodiment of the present invention, an application server is used (e.g., an Oracle9iAS integrated into a J2EE application server). The application server can support web application software, wireless, web page caching, business intelligence features, and offer complete integration in a single product. The application server can also offer scalability, reliability, and security features. It can also include advanced clustering features to keep critical applications up and running 24×7; offers zero downtime and planned downtime through a fast start fault recovery architecture; and recover from incidents quickly and gracefully.

In the example embodiment of an Oracle9i application server, the high availability infrastructure includes Oracle9iAS Web Cache clusters, Oracle HTTP Server (Apache), and Oracle9iAS Containers for J2EE. In addition, database applications hosted on Oracle9i Application Server can take advantage of Oracle9i Real Application Clusters (RAC) to make them more available. Oracle9i Application Server is the middle-tier deployment platform for all applications developed using Oracle9i Developer Suite. All applications can be deployed on the same middle-tier. Oracle9i Developer Suite is a complete and standards-based set of development tools. The suite includes Oracle9i 1Developer, Oracle's flagship J2EE and XML development environment that supports the full development life cycle of J2EE applications and Web services. It also includes Oracle9i Forms Developer for easily and quickly construct sophisticated database forms and business logic delivered through any Internet browser as a high performance, rich Java client.

Database. In one embodiment, the present invention uses a database with real application clusters (RAC) that can transparently scale and protect packaged applications with no changes necessary for the application (e.g., Oracle9i). RAC can scale all applications and also provides superior data protection with hot failover in less than 30 seconds.

According to one embodiment, the database provides a unique combination of scalability and availability in the same clustered database solution. With RAC, efficient scaling can be accomplished by simply adding servers to the overall cluster as the demand grows. Since RAC databases can grow flexibly, applications are protected from having to purchase excess computing power at a premium price. A RAC database can have costs significantly lower than the same solution implemented on an SMP (Symmetric Multi Processing) machine.

The database may include security and manageability features. The security features include: a Virtual Private Database (VPD); fine-grained auditing; data encryption.

The VPD technology provides programmatic row-level security and is enabled by associating tables or views with centrally defined access control policies. VPD addresses the application bypass problem and ensures that the same access control policy is enforced whether a user gains access to data through an application, ad hoc tool or SQL*Plus. As a result, multiple communities of users can securely share data within the same database.

Fine-grained auditing allows businesses to audit database activity by statement, system privilege, object or user. Its enhanced fine-grained auditing functionality enables organizations to centrally define specific audit policies that alert administrators to data access misuse. Audit records, stored within the database, capture the user statement's exact SQL text and can be easily viewed through ad hoc queries.

Data encryption is the ability to natively encrypt data in the database, enabling applications to guard sensitive data. Server-based encryption supports industry-standard Data Encryption Standard (DES) and Triple-DES (3DES), in both two and three key modes for any organizations who require the strongest level of encryption. Encryption can also support the MD5 secure cryptographic hash to ensure data integrity and a Federal Information Processing Standard (FIPS) 140-certified random number generator for generating secure encryption keys.

The manageability features include intelligent self-managing and tuning. The database can enhance database manageability by automating routine tasks, reducing complexity of administration and making the database more self-tuning and self-managing. Features can be added to streamline space, memory, and resource management as well as other day-to-day database administrative tasks.

RF Identification Mechanism, RF Device, and RF Reader/Writer. One embodiment of the present invention comprises: an RF identification mechanism (e.g., an RF laser card), RF decals containing a Chip (e.g., a 2K bit chip or data memory circuit) with contactless read/write capabilities and an integrated RF antenna (e.g., a 13.56 MHz RF antenna); and an RF reader/writer.

Figure 16:
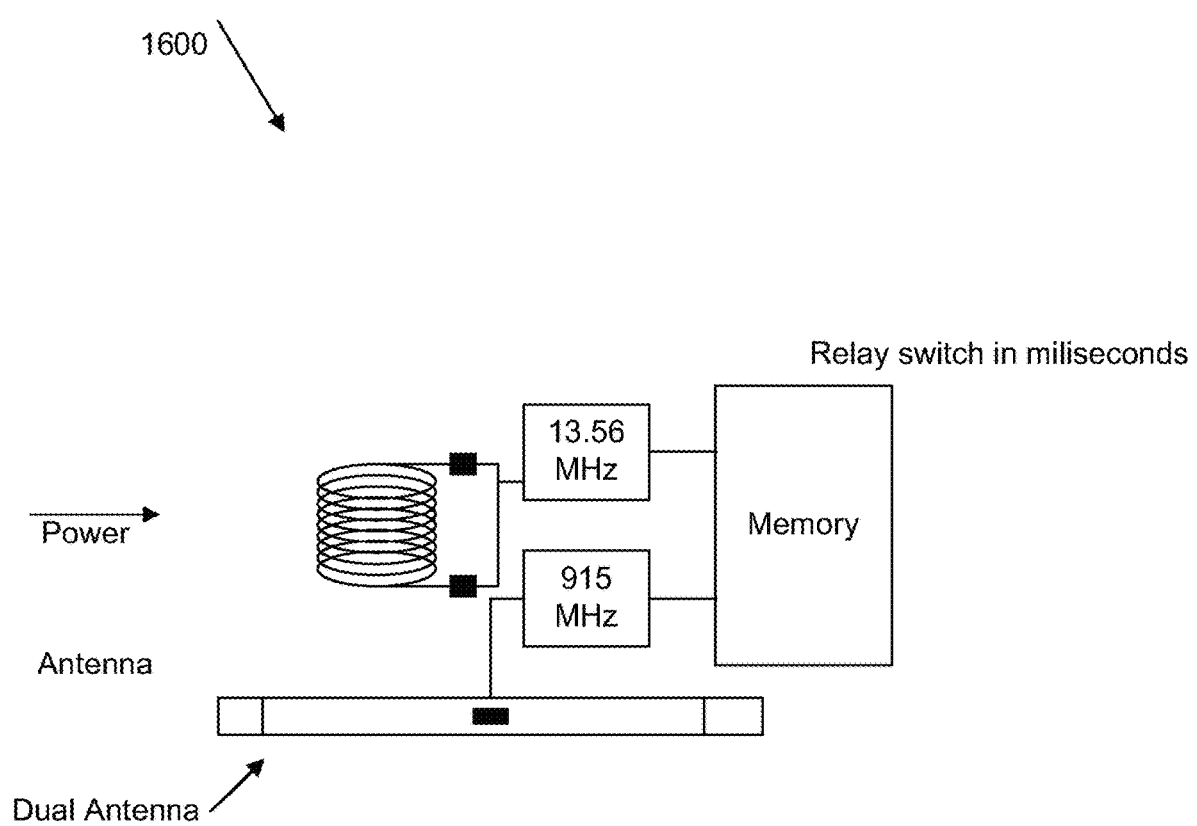

Multiple Chip Background Information. Often multiple frequencies are used. This takes advantage of the best electromagnetic and electrostatic characteristics of certain frequencies, one for long range reading and the second for field penetration (e.g., rain). Multiple frequencies can be created using a dual modulator that can switch in milliseconds from one frequency to another. (See FIG. 16.)

In one embodiment of the present invention, instead of, or in addition to incorporating the chip on the RF identification mechanism (e.g., RF smart laser card or RF decal), a chip can be embedded on a car windshield for smart windshield applications for vehicle registration, manufacturing, distribution of traffic violations, or any operation that requires contact with certain authorities. In this embodiment, the RF antenna can be used as radio antennas embedded on glass with copper wire during the manufacturing process, and connected to a module or embedded in the glass itself.

The resonant frequency of the antenna circuit in the RF device can be given by solving this equation:

$$f = \frac{1}{2\pi\sqrt{LC}}$$

$f$ = frequency (Hz)

$L$ = inductance ($H$)

$C$ = capacitance ($F$)

The frequencies at the poles are parallel resonant frequencies, and depending on the technology can be:

$$f_1 = 13.56 \; MH_z$$

$$f_2 = 915 \; MH_z$$

$$L = \frac{N^2 \mu_o A}{l}$$

$N$ = number of windings around inductor $\mu_o$ = permeability of freespace($Hm^{-1}$)

$A$ = cross-sectional area of inductor (m$^2$)

$l$ = length of inductor (m)

The inductance "L" depends on the number of turns of the coil, of the area perpendicular to the coil and of the permeability of free spaces and length of the coil. Therefore:

$$l = \frac{N^2 \mu_o A}{l} \Rightarrow$$

$$\frac{N^2 \mu_o A}{l} \; \frac{l}{f^2 4\pi^2 C} \Rightarrow$$

$$l = f^2 4\pi^2 N^2 \mu_o A$$

For $L_1=2,931\times10^8$H substitution, the following values are used:

$L_2=6.437\times10^{10}$ H

The data signal between the antenna and the tag is modulated by amplitude and coded by a Manchester encoding. Thus, manchester data=NRZ data^(NRZ clock).

Multiple RF Chip Overview

Figure 17:
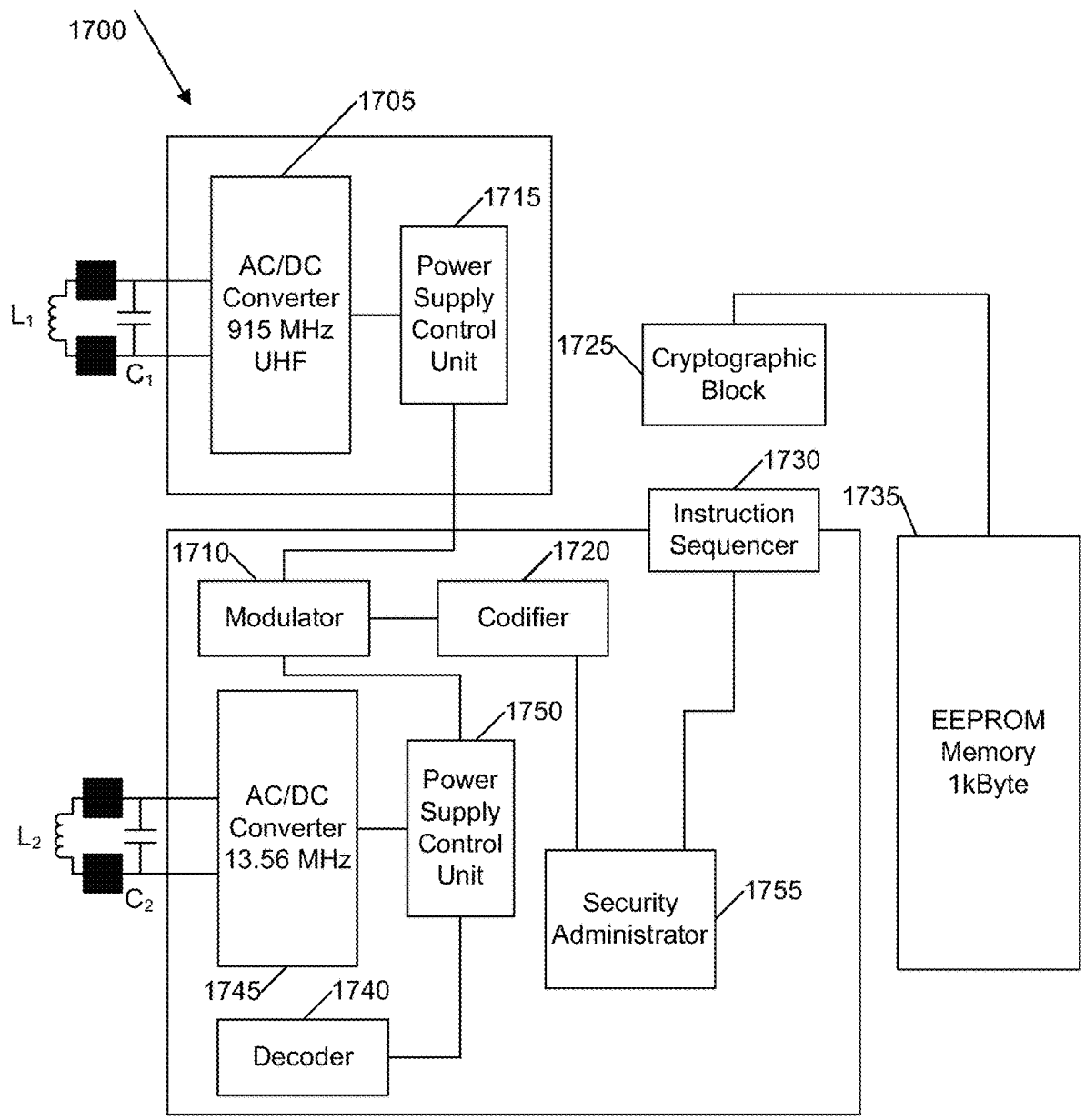

FIG. 17 illustrates an overview of the chip, according to one embodiment of the present invention. As described in detail above, the chip includes: an AC/DC converter (915 MHz) 1705 and accompanying power supply control unit 1715; a modular 1710; a codifier 1720; an AC/DC converter (13.56 MHz) 1745 and accompanying power supply control unit 1750; a decoder 1740; a security administrator 1755; an instruction sequencer 1730; a cryptographic block 1725, and memory 1735.

B. Method of Using a RF Border Crossing Control System

Figure 18:
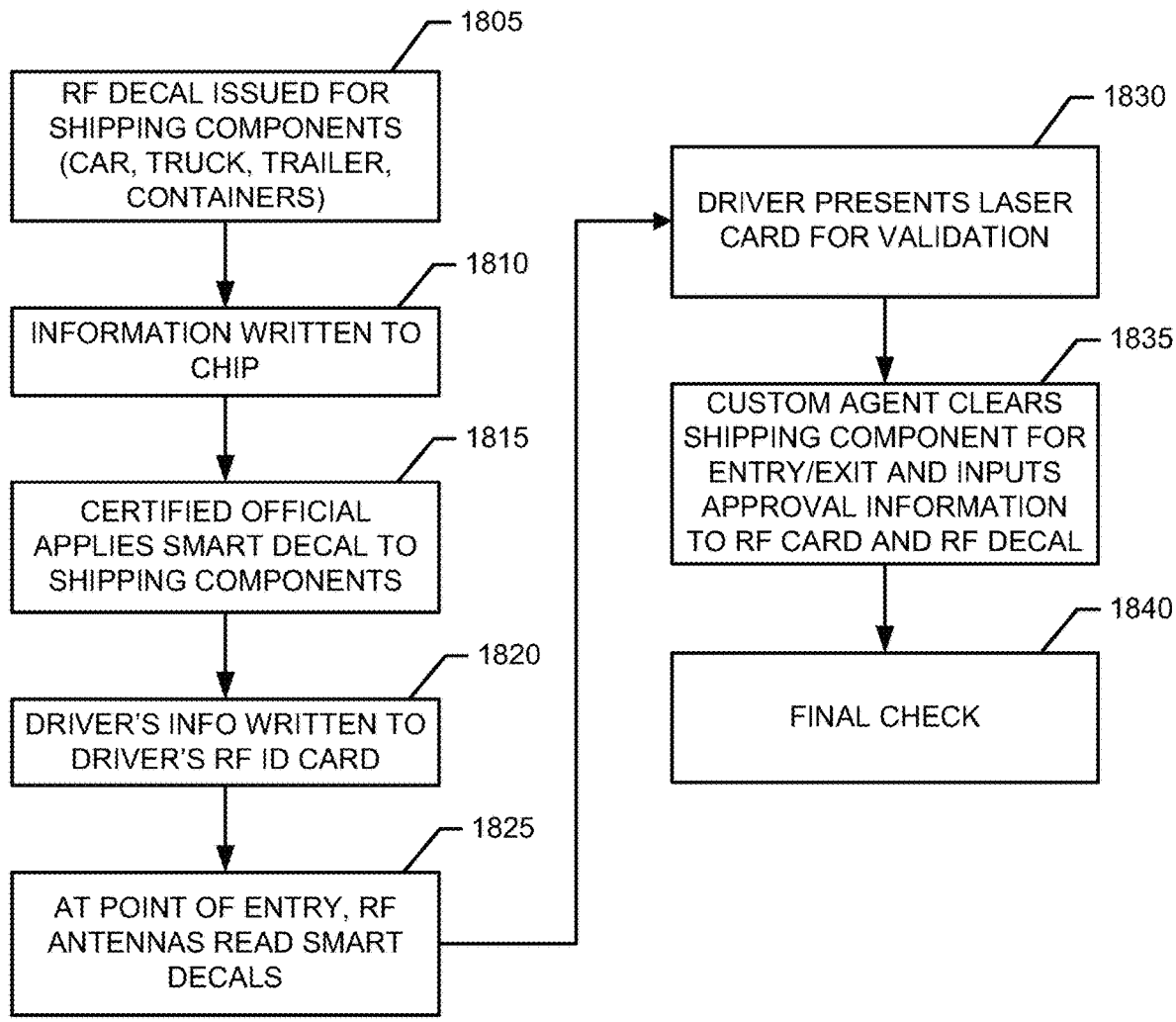

FIG. 18 illustrates method for using an RF border crossing control system 1800, according to one embodiment of the present invention. In 1805, an RF decal is issued at the point of origin for each shipping component (e.g., tractor/cab; trailer/bed; containers). In 1810, data is written to the embedded chip using a computer (e.g., a PC) located at the point of origin. Electronic forms can be used to ensure consistency, accuracy and completeness in the information gathering and decal Issuance process. Information includes: specific details for identification and verification of the tractor, trailer, and containers; specific information on the driver including photo and biometric information (e.g., fingerprint); time stamp of when the driver, tractor, trailer, and containers leave the point of origin.

In 1815, a certified official (e.g., company official, customs agent) applies the RF decal to the shipping components (e.g., cab, trailer, containers) at the point of origin or other appropriate place. In 1820, the driver's personal data and shipment information are written to the driver's RF identification mechanism (e.g., laser card) at the point of origin or other appropriate place.

In 1825, at the point of entry or other appropriate place, RF antennas automatically read the RF decals as the vehicle approaches the custom's station and displays the data. A display screen on a computer (e.g., PC, PDA) in the customs area displays a reading of each RF decal as they pass within X number of feet of the antennas. The computer validates each RF decal by providing identification information (e.g., driver's photo, fingerprint, other data input at point of origin.) In 1830, the driver presents his RF laser card to a custom's officials at the point of entry (or other appropriate place) for validation and shipment verification. In 1835, the customs agent clears the shipping components for entry/exit and inputs this approval information to the RF card and RF decal. If the vehicle requires additional customs inspections, the customs agent will assign the next inspection station information to the driver's RF card and RF decals.

In 1840, as an additional option, at the conclusion of the customs inspection process, and after all approval data is written to the RF decals, a final check is conducted at the port exit or other appropriate place. As the vehicle approaches the exit point, the RF decals are read for the final check to ensure all have matching data. This will be proof that the vehicle passed through all required checkpoints, inspections, and processing. As with the point of entry, each RF decal is read in sequence and the information is displayed to the custom agent's display screen. If any RF decal information does not match, the display will indicate a stop and the vehicle will be stopped for additional inspection or validation.

VI. System and Method for Limiting Software Downloads

One embodiment of the present invention relates to a de-metalizing edging process, and various resultant combinations of embedded processor chip, antenna, metallic hologram, integrated circuit, and substrate form factors to produce an end product (e.g., smart card or smart label). This enables RF communication within a networked system configured for various identification and verification applications. These security RF smart labels can be adapted to the identification and data capture requirements associated with unique software media or packaging of any software publisher, ISV or manufacturer.

A. System for Limiting Software Downloads

Figure 19:
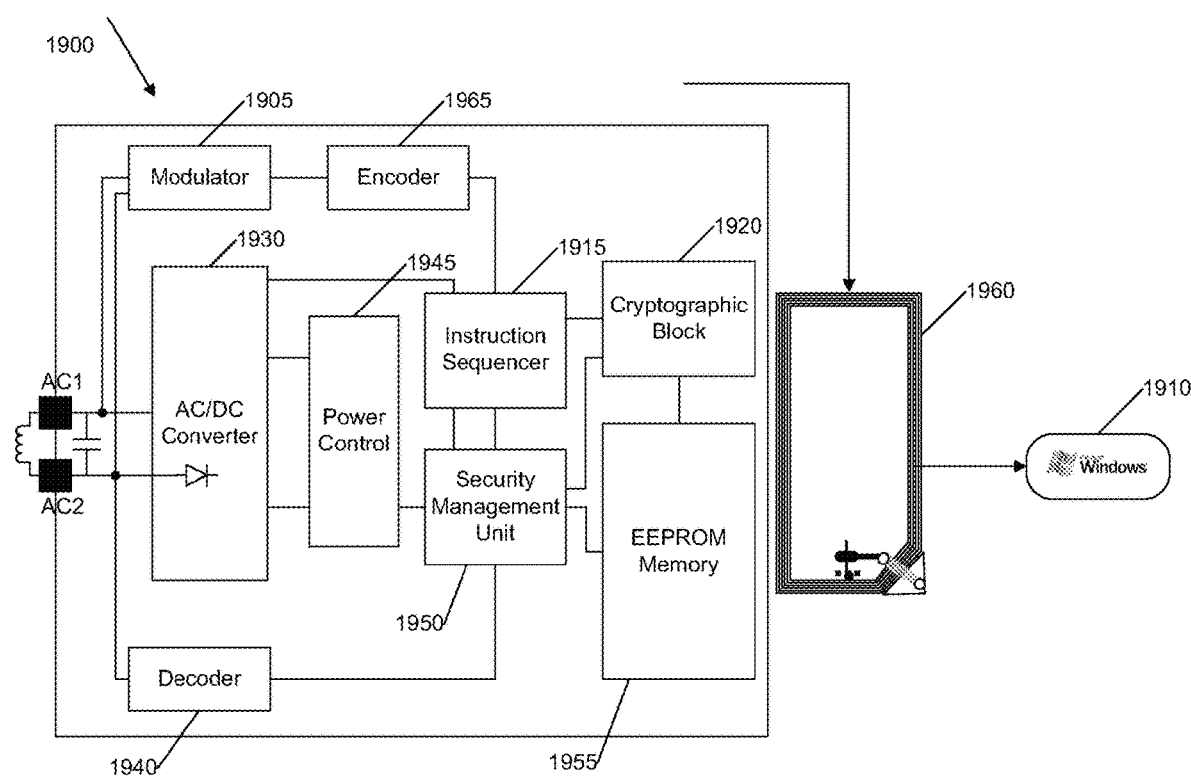

FIG. 19 illustrates system for limiting software downloads, according to one embodiment of the present invention. The system includes a RF read/write device, an RF smart label with a chip and RF antenna, and the software.

The software media (e.g., a CD) and/or package carries an RF smart label, containing an RF antenna providing a link to a chip 1900. The chip has encryption and read/write capabilities. Access is controlled through a certificate of authenticity 1910. Working in combination with an RF reader/writer, the present invention will capture any available unique digital central processing unit (CPU) or processor number and read/write to an original certificate of authenticity. The system locks the certificate to the CPU or processor, and will not allow this unique software to be installed on any machine other than the one on which it was initially authorized to be loaded. This highly secure encrypted solution can also be used to control access to customer support, debugs, updates and other services via the network (e.g., Internet) for authentic paid software licenses only. As described above, the chip includes a modulator 1905, encoder 1965, decoder 1940, instruction sequencer 1915, cryptographic block 1920, converter 1920, power control 1945, security management 1950, memory 1955, and antenna 1960.

VPN Tunnel Mode. The present invention can be incorporated into a network, such as a Virtual Private Network (VPN). A VPN is a private data network that makes use of the public telecommunication network or Internet infrastructure, maintaining privacy through the use of security and authentication procedures. A VPN is the emulation of a virtual private Wide Area Network (WAN) facility using Internet Protocol (IP) facilities. The VPN may use many aspects of networking, such as IP addressing, advertising reach ability, Quality of Service (QoS), data security and access control.

Figure 20:
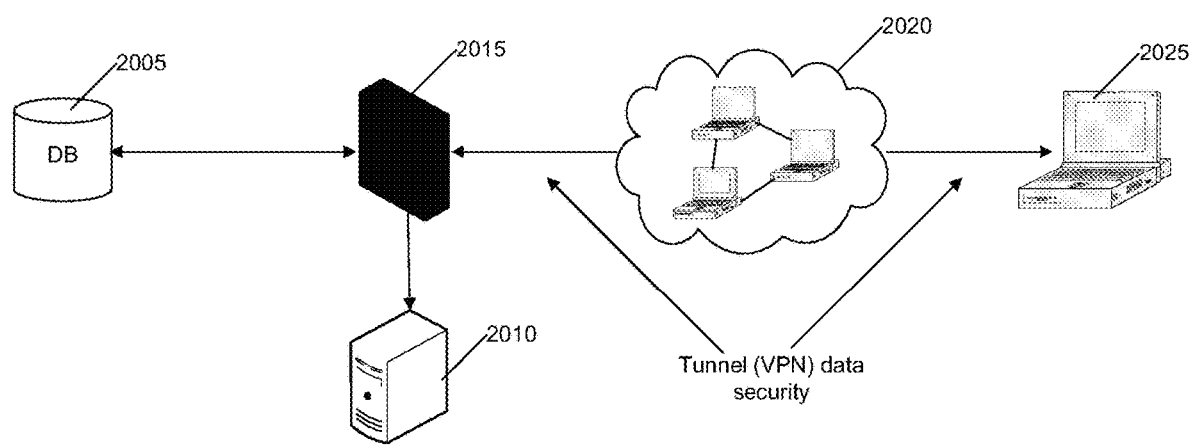

FIG. 20 illustrates a VPN tunnel mode solution, according to one embodiment of the present invention. A database 2005 is connected to a security gateway 2015, which is connected to an application server 2010, connected to the client 2025 through a network 2020. Tunnel mode is used when one or more IP clients need to communicate to a main computer or server computer. The tunnel mode utilizes data encryption and key management. The VPN end points monitor the operation of the VPN tunnels (VPN clients) to ensure the connectivity has not been lost, and take appropriate action if there has been a failure. This is very important because all applications are dependent.

The present invention utilizes features that provide high-quality, interoperable cryptographic base security for access central information. For example, two traffic protocols are used: an Authentication Header (AH) that provides data integrity; and an Encapsulation Security Payload (ESP) that provides confidentiality (e.g., encryption of data), data integrity, and thought use of cryptographic-key management procedures. ESP is known as an Internet Key Exchange (IKE) protocol. This protocol negotiates the security association between two end points and exchanges keys between them.

There exist two operation modes for both AH and ESP: transport mode and tunnel mode. Transport mode is used to authenticate information transmitted between nodes or machines (e.g., computers, servers) on a WAN/LAN network. Tunnel mode is used for communication between two or more end points that pass through a public network (e.g., the Internet). Tunnel mode is used to provide more security for information accessed by remote users or applications.

Figure 3B:
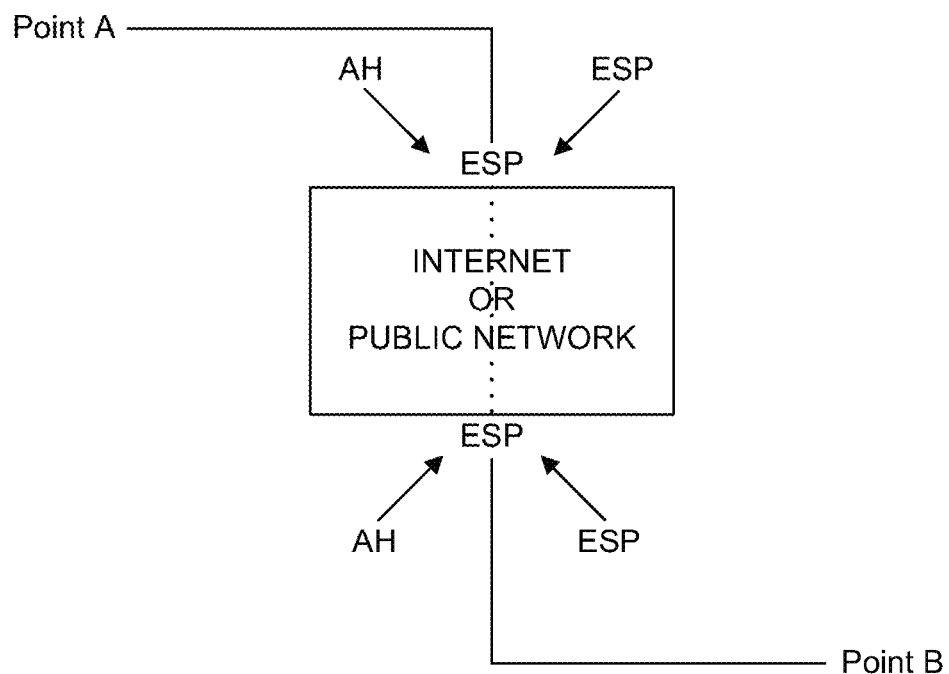

FIG. 3A illustrates the differences between transport mode and tunnel mode. The use of AH and ESP are illustrated in FIG. 3B.

B. Method of Limiting Software Downloads

Figure 21:
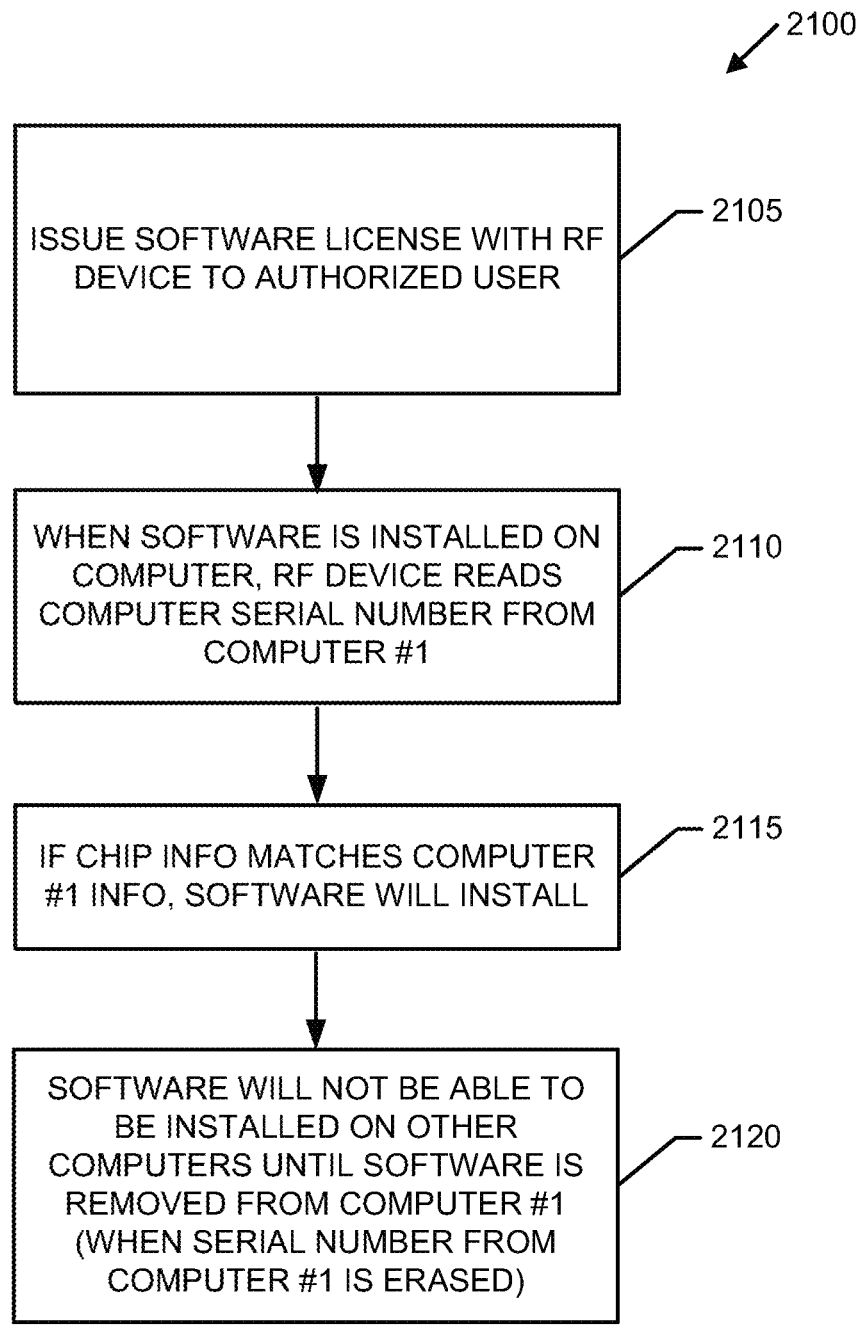

FIG. 21 illustrates method for limiting software downloads to authorized users 2100, according to one embodiment of the present invention. In 2105, a software license is issued with an RF device (including a chip with an RF antenna) to an authorized user for one computer. In 2110, when the user installs the software on a computer (e.g., computer #1), the RF device reads the computer's serial number from computer #1. In 2115, if the chip information on the RF device matches the information on computer #1, the software is installed. In 2120, as the software license in this case is for only one computer, the software will not be able to be installed on other computers until the software is removed from computer #1, when the serial number from computer #1 is erased. In an alternate embodiment, where a license is granted for X number of users, only X number of computer serial numbers will be able to be checked by the RF device, and thus only X users can download the software.

In additional embodiments, use of other unique identifying characteristics associated with other computer components (e.g., mouse, motherboard or central processing unit cabinet), can be utilized. In a further embodiment, the present invention is used for multi-license and corporate environments. In these cases, where an authorized corporate licensing entity with a registered billing address has access to software through a network (e.g., the Internet), the RF device limits the download of software to the number of users or units authorized under the license agreement. The present invention can control downloads to any computer, including central servers or individual PCs. This simple, yet highly secure kit locks the number of each CPU or processor for the central server and the PCs to the authorized number of users for each version of software, thus providing a seamless, secure upgrade capability. In an additional embodiment, the present invention provides an adapted PDA to provide additional support for software distribution and inventory control, as well as instant legal software authentication for law enforcement and industry piracy control.

VII. System and Method for Airport Security

The present invention is a scalable, end-to-end RF identification system for airport and air transport security and addresses, for example, the following issues: establishes the actual identity of a passenger; runs a hot file fingerprint search against the INS, CIA, INTERPOL, FBI databases; links passenger to boarding pass and checked/handheld baggage; cross-verifies passenger identification at strategic points within the airport environment; cross-verifies stowed baggage with boarded passengers; track individuals within the airport; highly secure, cost effective, and non-intrusive; enables speedy and accurate passenger processing. In a security system that ultimately extends to existing airline and government computer systems and databases, the present invention is the "final link" that allows designated security personnel to track and validate on the spot the status of persons or items throughout the airport environment.

While the invention is described in the context of airport security, those experienced in the art will see that any facility (e.g., train station, ship, company campus, university campus) with a need for security can use the present invention, and the present invention is not limited to use in an airport facility.

A. Airport Security System

Figure 22:
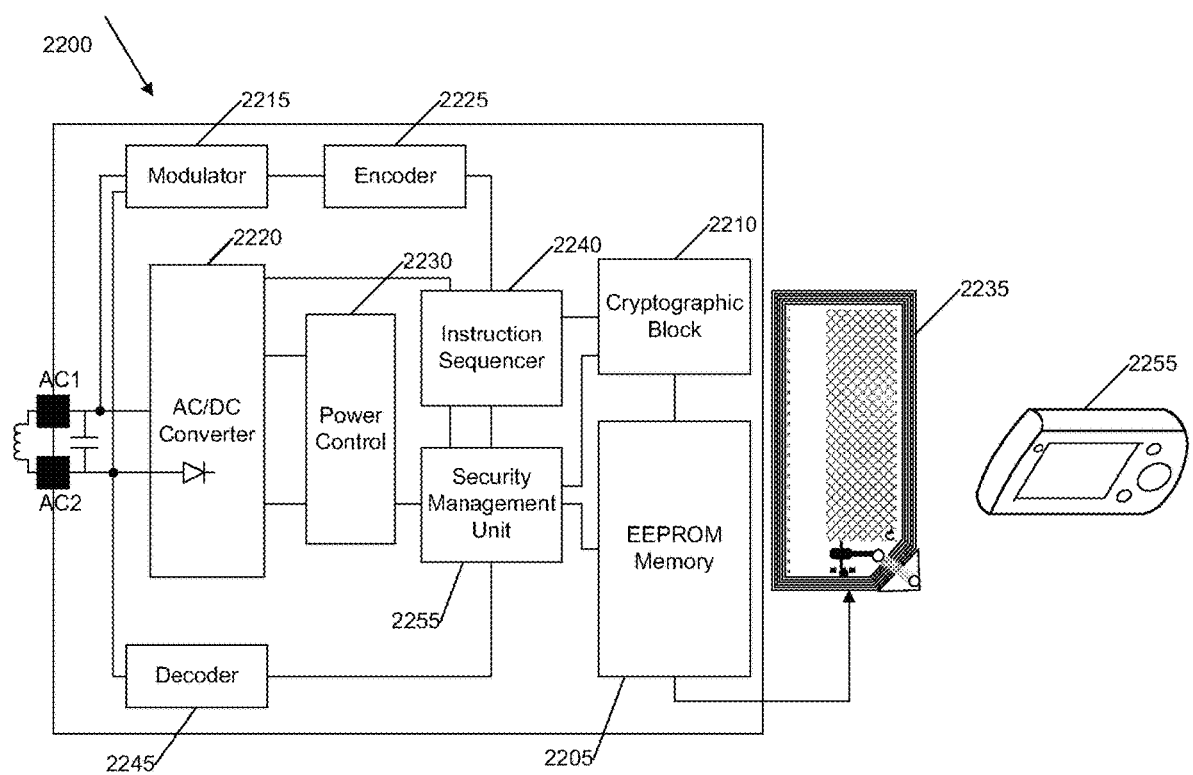
FIGS. 22-23 illustrate a description of the system and method for airport security, in an embodiment of the present invention.

FIG. 22 illustrates a chip of an airport security system, according to one embodiment of the present invention. The present invention includes: an RF reader/writer; and an RF identification mechanism (e.g., RF boarding pass, RF luggage tags, RF identification cards) including an RF device. Alternatively, AFIS verification scanners, security and control software, and distributed databases can be included.

The RF reader/writer can comprise computer system components (e.g., remote readers/writers, verification scanners, client/server or thin client systems and networks, and application software and databases).

The RF device contains an integrated computer chip and RF antenna for contactless communication at an operating frequency of, for example, 13.56 MHz.

The chip contains unique identifying data for persons or items subject to scrutiny, and can be read by nearby security or other control personnel with handheld or stationary RF reader/writer or RF reader/writer devices for real time validation. Furthermore, the RF device is manufactured with light diffraction and other high security print features that eliminate document forgery and enable instant visual verification of authenticity. The RF device also includes an integrated AFIS digital fingerprint capability. The present invention can also use other unique identifying characteristics associated with additional elements of the air transport industry, including cargo, flight services, maintenance, and aircraft parts.

As described above, the chip has a memory 2205 (e.g., 2 k), an option hardware wired cryptographic block 2210 (with 4 exchange encrypted keys with up to 256 bits), a modulator 2215, a converter 2220, an encoder 2225, a power control 2230, an instruction sequencer 2260, a decoder 2245, a security management unit 2255, a memory 2205.

B. Method of Airport Security

Figure 23:
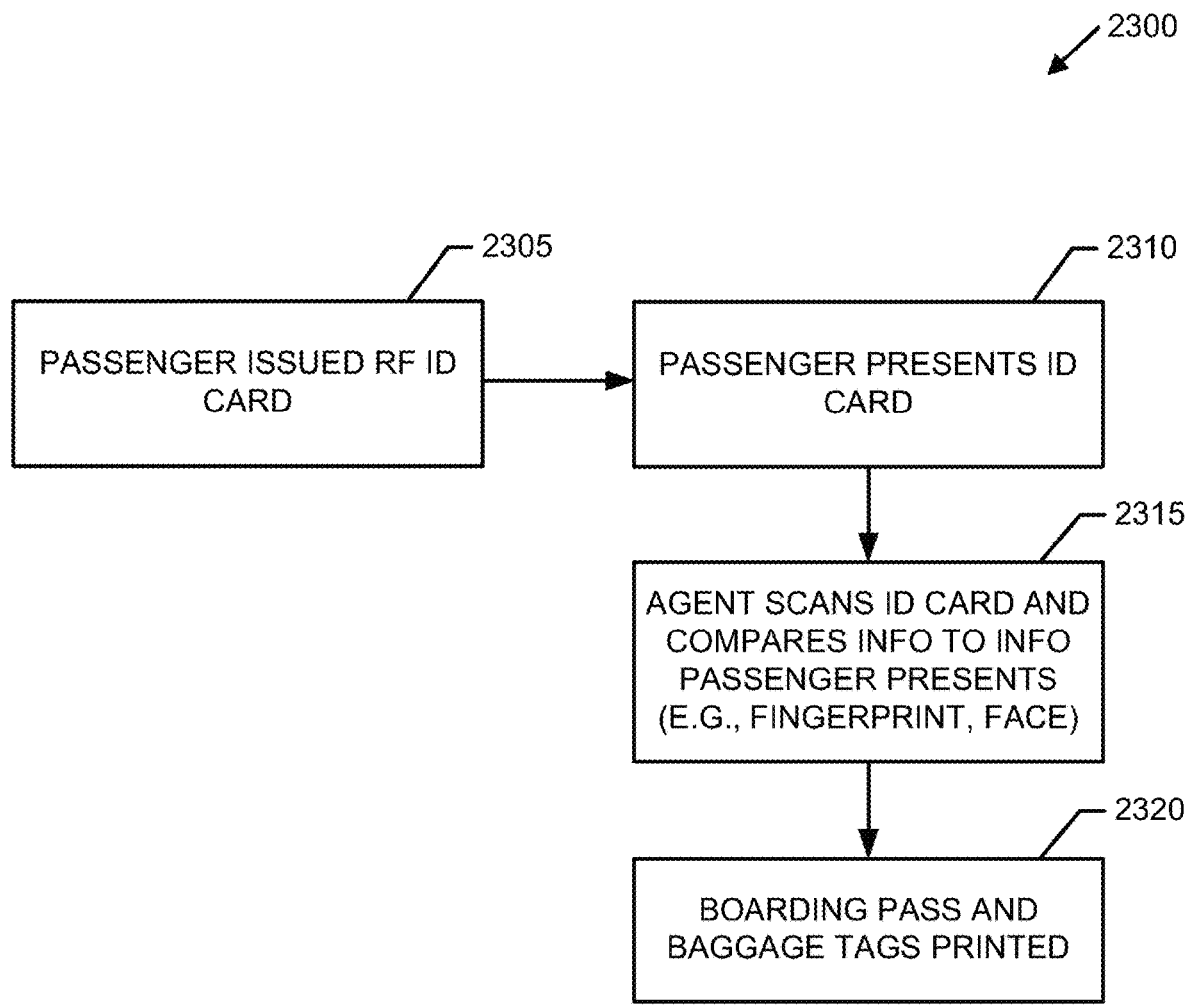

FIG. 23 illustrates a method of airport security, according to one embodiment of the present invention. In 2305, to facilitate air travel security, passengers are issued an official RF air travel identification card (e.g., with a photo and fingerprint scan) by a federal authority or the airlines following an agreeable level of background check. This process could be as simple as checking names verified by some acceptable identification (e.g., drivers' license, passport) against a networked hot list. The identification data is read and locked to the RF air travel identification card. During processing and prior to issuance, applicants' biometrics are processed and compared with a "one-to-many" hot list. With a successful security check, the applicant is issued a highly secure identification document with unique visual, biometric, and descriptive data that can be quickly verified throughout the airport and across the air travel system. A similar process would be applied to airport, airline, and service personnel. Those experienced in the art will note that a general RF identification card or mechanism (e.g., PDA) can be used instead of specific air travel RF identification card.

In 2310, a passenger presents the RF air travel identification card or other RF identification mechanism to the airline authority when traveling. In 2315, The agent scans the RF air travel identification card. In 2320, the RF boarding pass and RF baggage tags are printed for the passenger. The boarding card now contains all data and tracking mechanisms required for secure passenger access to the gate and the matching aircraft, as well as boarding verification. In an alternative embodiment, instead of issuing an RF boarding pass, the RF air travel identification card can also contain e-ticket information. In parallel to the issuance of the boarding pass, identity information is captured by the system and digitally copied, together with the relevant travel route and destination data onto the RF baggage tags. The RF baggage tags are printed through systems and printers enhanced with an RF identification write device. The RF baggage tag now contains all data and tracking mechanisms required to link passenger, bag, and flight, thus enabling verifiable passenger/baggage/flight cross-referencing to the matching aircraft.

CONCLUSION

Additional advantages and novel features of the invention will be set forth in part in the Attachments that follow, and in part will become more apparent to those skilled in the art upon examination of the following or upon learning by practice of the invention.

What is claimed is:

1. A mobile device, comprising:
   a biometric input device configured to read biometric data;
   a radio frequency cellular circuit;
   at least one memory configured to store transaction information associated with an individual, biometric information for identifying the individual associated with the transaction information, and a security key based on the biometric information;
   a processor coupled with the at least one memory and the biometric input device, the processor configured to:
   receive a signal, via the radio frequency cellular circuit, comprising a request to retrieve the transaction information,
   prompt a user to provide biometric data to the biometric input device and receive the biometric data from the biometric input device,
   receive a security key based on the received biometric data and check and validate the security key against the security key stored in the at least one memory based on comparing the received biometric data with the biometric information stored in the at least one memory, and
   transmit, via the radio frequency cellular circuit, the transaction information when the received security key is successfully validated, wherein the transaction information is encapsulated using a key.

2. The mobile device of claim 1, further comprising a cryptographic block configured to store security keys that are checked and validated to grant or deny access to the at least one memory.

3. The mobile device of claim 1, wherein the mobile device is one of a cellphone, smartphone, or tablet.

4. The mobile device of claim 1, wherein the biometric input device is a fingerprint scanner.

5. The mobile device of claim 1, wherein the processor is further configured to transmit the received biometric data or the stored biometric information with the purchase information.

6. The mobile device of claim 1, wherein the transaction information comprises account information.

7. The mobile device of claim 1, wherein the transaction information comprises credit card information.

8. The mobile device of claim 7, wherein the at least one memory configured to store the biometric information and the at least one memory configured to store the transaction information are the same memory.

9. The mobile device of claim 1, wherein the signal comprising a request to retrieve transaction information is received from a point of sale terminal or a point of contact.

10. The mobile device of claim 1, further comprising short range radio frequency circuitry, and wherein transmission of the purchase information is to a point of sale device via the short range radio frequency circuitry.

11. The mobile device of claim 1, wherein the process is further configured to carry out an exchange of cryptographic keys, via the radio frequency cellular circuit, wherein the key for encapsulating the purchase information is based on the exchanged cryptographic keys.

12. A method, comprising:
   receiving a signal, via a radio frequency cellular circuit of a mobile device, comprising a request to retrieve transaction information, the transaction information associated with an individual stored in at least one memory of the mobile device;
   prompting a user to provide biometric data to a biometric input device of the mobile and receiving the biometric data from the biometric input device;
   receiving a security key based on the received biometric data;
   checking and validating the received security key against a stored security key in the at least one memory of the mobile device based on comparing the received biometric data with biometric information stored in the at least one memory of the mobile device, the stored security key is based on the biometric information that identifies the individual associated with the transaction information; and
   transmitting, via the radio frequency cellular circuit of the mobile device, the transaction information when the received security key is successfully validated, wherein the transaction information is encapsulated using a key.

13. The method of claim 12, further comprising storing security keys in the at least one memory of the mobile device that are checked and validated to grant or deny access to the at least one memory of the mobile device.

14. The method of claim 12, further comprising transmitting the received biometric data or the stored biometric information with the purchase information.

15. The method of claim 12, wherein the signal comprising a request to retrieve transaction information is received from a point of sale terminal or a point of contact.

16. The method of claim 12, wherein transmitting the purchase information comprises transmitting to a point of sale device via short range radio frequency circuitry of the mobile device.

17. The method of claim 12, further comprising exchanging cryptographic keys, via the radio frequency cellular circuit, wherein the key for encapsulating the purchase information is based on the exchanged cryptographic keys.

* * * * *